US010767592B2

(12) United States Patent
Fujiwara et al.

(10) Patent No.: US 10,767,592 B2
(45) Date of Patent: Sep. 8, 2020

(54) FAILURE DIAGNOSIS DEVICE FOR IN-CYLINDER PRESSURE SENSOR

(71) Applicant: Mazda Motor Corporation, Aki-gun, Hiroshima (JP)

(72) Inventors: Shoji Fujiwara, Hiroshima (JP); Hidetoshi Hashimoto, Aki-gun (JP); Takuji Okumura, Kure (JP); Shigeru Nakagawa, Hiroshima (JP); Yasushi Torii, Hiroshima (JP); Masayuki Kinoshita, Hiroshima (JP); Yuichiro Tsumura, Aki-gun (JP); Daisuke Tanaka, Hiroshima (JP); Taiki Maiguma, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 0 days.

(21) Appl. No.: 16/459,969

(22) Filed: Jul. 2, 2019

(65) Prior Publication Data

US 2020/0072150 A1 Mar. 5, 2020

(30) Foreign Application Priority Data

Sep. 3, 2018 (JP) .................. 2018-164811

(51) Int. Cl.
*F02D 41/22* (2006.01)
*F02B 77/08* (2006.01)
*F02D 41/12* (2006.01)
*F02P 5/04* (2006.01)
*F02P 5/15* (2006.01)
(Continued)

(52) U.S. Cl.
CPC .......... *F02D 41/222* (2013.01); *F02B 77/085* (2013.01); *F02D 41/123* (2013.01); *F02P 5/045* (2013.01); *F02P 5/151* (2013.01); *G01M 15/08* (2013.01); *G07C 5/0808* (2013.01); *G07C 5/0825* (2013.01); *G08B 21/182* (2013.01); *F02D 2200/024* (2013.01)

(58) Field of Classification Search
CPC .. F02D 41/222; F02D 41/123; F02D 41/3041; F02D 2200/024; F02D 35/023; F02B 77/085; F02P 5/045; F02P 5/151; G01M 15/05; G07C 5/0825; G07C 5/0808; G08B 21/182
USPC ...... 123/435; 701/107, 111; 73/35.03, 35.06, 73/35.12, 114.16, 114.17, 114.18
See application file for complete search history.

(56) References Cited

FOREIGN PATENT DOCUMENTS

JP 2010144670 A 7/2010

*Primary Examiner* — Hai H Huynh
(74) *Attorney, Agent, or Firm* — Alleman Hall Creasman & Tuttle LLP

(57) ABSTRACT

A failure diagnosis device for an in-cylinder pressure sensor includes an in-cylinder pressure sensor, and a controller comprised of circuitry configured to execute a diagnosis module into which a signal of the in-cylinder pressure sensor is inputted and configured to diagnose a failure of the sensor based on the signal. The diagnosis module includes a reading module configured to read the signals of the in-cylinder pressure sensor at a first timing that is a timing retarded by a specific crank angle from a compression top dead center, and at a second timing that is a timing advanced by the specific crank angle from the compression top dead center, and a failure determining module configured to determine that the in-cylinder pressure sensor has failed when the failure determining module determines that a difference between signal values at the first timing and at the second timing exceeds a predefined threshold.

10 Claims, 18 Drawing Sheets

(51) Int. Cl.
*G01M 15/08* (2006.01)
*G07C 5/08* (2006.01)
*G08B 21/18* (2006.01)

FAILURE DIAGNOSIS DEVICE FOR IN-CYLINDER PRESSURE SENSOR

TECHNICAL FIELD

The technology disclosed herein relates to a failure diagnosis device for an in-cylinder pressure sensor.

BACKGROUND OF THE DISCLOSURE

JP2010-144670A discloses an abnormality detecting device for an in-cylinder pressure sensor which detects the pressure inside a combustion chamber of an engine. The in-cylinder pressure sensor of this device includes a deforming part which deforms by the in-cylinder pressure, and a strain gage adhered to the deforming part. When the material composition of the deforming part is changed due to the influences of heat, etc. and the modulus of elasticity increases, the deforming part becomes difficult to be elastically deformed, and the gain of the output value of the in-cylinder pressure sensor decreases. Therefore, this device detects the gain of the output value of the in-cylinder pressure sensor, and when the gain is low, it concludes that the in-cylinder pressure sensor is abnormal.

In order to prevent a false diagnosis, when the gain of the output value of the in-cylinder pressure sensor is low and the output waveform is deviated in time, this device concludes that the engine is abnormal, and on the other hand, when the gain of the output value of the in-cylinder pressure sensor is low and the output waveform is not deviated in time, it concludes that the in-cylinder pressure sensor is not abnormal.

The present inventors have determined the gain of the output value of the in-cylinder pressure sensor, as a result of diligent examinations. Specifically, although the detailed mechanism is unknown, it was newly determined that the symmetry of the signal value of the in-cylinder pressure sensor collapses, when the in-cylinder pressure sensor has failed by being damaged under the influence of heat etc. In this case, a difference between the signal value of the in-cylinder pressure sensor at the timing where the crank angle is advanced by a given amount from a compression top dead center, and the signal value of the in-cylinder pressure sensor at the timing where the crank angle is retarded by the same amount from the compression top dead center increases.

Although the technology disclosed in JP2010-144670A takes the gain of the output value of the in-cylinder pressure sensor into consideration, since it does not take the symmetry of the output value at all into consideration, the present inventors have noticed that there is room for improvement for the accuracy of the abnormality diagnosis.

SUMMARY OF THE DISCLOSURE

The technology disclosed herein increases an accuracy of a failure diagnosis of an in-cylinder pressure sensor.

According to one aspect of the present disclosure, a failure diagnosis device for an in-cylinder pressure sensor is provided. The device includes an in-cylinder pressure sensor disposed so as to face to the inside of a combustion chamber of an engine mounted to an automobile, and configured to output a signal corresponding to a pressure inside the combustion chamber, and an engine controller comprised of circuitry configured to execute a diagnosis module into which the signal of the in-cylinder pressure sensor is inputted and diagnose a failure of the in-cylinder pressure sensor based on the signal of the in-cylinder pressure sensor.

The diagnosis module includes a reading module configured to read the signal of the in-cylinder pressure sensor at a predefined first timing that is a timing retarded by a specific crank angle from a compression top dead center, and the signal of the in-cylinder pressure sensor at a predefined second timing that is a timing advanced by the specific crank angle from the compression top dead center, and a failure determining module configured to determine that the in-cylinder pressure sensor has failed when the failure determining module determines that a difference between a signal value of the in-cylinder pressure sensor at the first timing and a signal value of the in-cylinder pressure sensor at the second timing exceeds a predefined threshold.

According to this configuration, the diagnosis module compares the difference between the signal value of the in-cylinder pressure sensor at the first timing and the signal value of the in-cylinder pressure sensor at the second timing with the predefined threshold. The failure determining module determines that the in-cylinder pressure sensor has failed when the difference exceeds the threshold. Thus, the failure diagnosis of the in-cylinder pressure sensor can accurately be performed.

The diagnosis module may make the threshold smaller as a speed of the engine increases.

The difference between the signal value of the in-cylinder pressure sensor at the first timing and the signal value of the in-cylinder pressure sensor at the second timing becomes larger by being influenced by cooling loss. The influence of the cooling loss may become a factor of error when diagnosing the failure of the in-cylinder pressure sensor, although it is unrelated to the failure of the in-cylinder pressure sensor. In order to improve the accuracy of the failure diagnosis of the in-cylinder pressure sensor, it is effective to set the threshold larger than the difference influenced by the cooling loss.

On the other hand, when the engine speed is high, since the cooling loss per unit time decreases, the difference described above becomes smaller. Thus, in this case, the threshold is set to be smaller than that when the engine speed is low, it is effective to improve the accuracy of the failure diagnosis of the in-cylinder pressure sensor.

The diagnosis module may make the threshold larger as an amount of air filled up in the combustion chamber increases.

When the air amount filled up in the combustion chamber is large, a leak of air from fitting parts of piston rings during the compression stroke increases, and therefore, the pressure inside the combustion chamber after the compression top dead center falls. As a result, the difference between the signal value of the in-cylinder pressure sensor at the first timing and the signal value of the in-cylinder pressure sensor at the second timing may become large. This influence may become a factor of the error when diagnosing the failure of the in-cylinder pressure sensor, although it is unrelated to the failure of the in-cylinder pressure sensor. In order to improve the accuracy of the failure diagnosis of the in-cylinder pressure sensor, it is effective to set the threshold larger than the difference influenced by the leak loss.

According to this configuration, when the air amount filled into the combustion chamber is large, the diagnosis module sets the threshold larger than when the air amount is small. Thus, it becomes advantageous for performing the failure diagnosis of the in-cylinder pressure sensor more accurately.

The failure determining module may repeatedly perform a comparison of the difference with the threshold. The failure determining module may determine that the in-cylinder pressure sensor has failed when a determination that the difference exceeds the threshold is made continuously a plurality of times.

For example, as a result of the mating of the parts which constitute the in-cylinder pressure sensor being changed during a compression stroke, the pressure inside the combustion chamber may fall after a compression top dead center. Although such a pressure fall is only a temporary phenomenon, there is a possibility of causing a false diagnosis of the in-cylinder pressure sensor.

On the other hand, since the pressure inside the combustion chamber falls continuously when the in-cylinder pressure sensor actually fails, it becomes advantageous for performing the failure diagnosis of the in-cylinder pressure sensor more accurately if the determination by the failure determining module is repeatedly performed as described above.

The diagnosis module may include an informing device configured to inform of the failure when the failure determining module determines the failure of the in-cylinder pressure sensor.

According to this configuration, the user is informed of the failure of the in-cylinder pressure sensor, and as a result, the broken in-cylinder pressure sensor is replaced, for example.

The failure diagnosis device may further include an engine control module into which a signal of one or more sensors at least including the in-cylinder pressure sensor is inputted and configured to operate the engine based on the signal of the one or more sensors. The engine control module may stop a supply of fuel to the engine, when a fuel cut condition is satisfied, while the automobile travels. The diagnosis module may perform the failure diagnosis of the in-cylinder pressure sensor, while the engine control module stops the supply of fuel to the engine.

While the engine control module stops the fuel supply to the engine, the combustion is not performed in the combustion chamber. That is, the signal value of the in-cylinder pressure sensor increases and decreases only depending on the volume change of the combustion chamber. The failure determining module can perform the failure diagnosis of the in-cylinder pressure sensor more accurately based on the difference between the signal value of the in-cylinder pressure sensor at the first timing and the signal value of the in-cylinder pressure sensor at the second timing.

Moreover, the failure diagnosis device may further include an ignition plug, disposed so as to face to the inside of the combustion chamber, and configured to ignite a mixture gas inside the combustion chamber in response to an ignition signal of the engine control module. A portion of the mixture gas inside the combustion chamber may start combustion accompanied by flame propagation, by forcible ignition of the ignition plug, and remaining unburnt mixture gas may then combust by self-ignition. The engine control module may output the ignition signal to the ignition plug before a target timing so that the unburnt mixture gas self-ignites at the target timing. The engine control module may estimate a timing at which the unburnt mixture gas self-ignites based on the signal of the in-cylinder pressure sensor.

The present applicant proposes SPCCI (SPark Controlled Compression Ignition) combustion which is a combination of SI (Spark Ignition) combustion and CI (Compression Ignition) combustion. SI combustion is a combustion accompanied by the flame propagation by forcibly igniting the mixture gas inside the combustion chamber, and CI combustion is a combustion which starts by the mixture gas inside the combustion chamber being compressed and ignited. SPCCI combustion is a form of combustion in which, by forcibly igniting the mixture gas inside the combustion chamber, the combustion by flame propagation starts, and then, due to the heat generated by the SI combustion and the pressure build-up inside the combustion chamber by flame propagation, unburnt mixture gas inside the combustion chamber carries out CI combustion.

CI combustion is performed when the in-cylinder temperature reaches an ignition temperature defined by composition of the mixture gas. If the in-cylinder temperature reaches the ignition temperature near the compression top dead center and then CI combustion is performed, fuel efficiency of SPCCI combustion is maximized.

Meanwhile, in SPCCI combustion, if CI combustion takes place near the compression top dead center, the in-cylinder pressure may rise excessively, and thereby combustion noise may become excessive. In such a case, since CI combustion will take place when a piston descends considerably during expansion stroke if the ignition timing is retarded, combustion noise can be reduced. However, fuel efficiency of the engine decreases.

In order to achieve both the reduction of combustion noise and the improvement of fuel efficiency in the engine which performs SPCCI combustion, SPCCI combustion must be controlled so that a combustion waveform which changes according to the advancing of a crank angle becomes a suitable combustion waveform.

In order to control SPCCI combustion, for example, a CI combustion start timing $\theta ci$ can be used as a parameter indicative of a characteristic of SPCCI combustion. The CI combustion start timing $\theta ci$ is a timing at which unburnt mixture gas self-ignites. If an actual $\theta ci$ is advanced exceeding a target $\theta ci$, since CI combustion occurs at a timing near the compression top dead center, combustion noise increases. Then, in order to reduce combustion noise, the engine control module must recognize the actual $\theta ci$.

If the actual $\theta ci$ can be estimated, the engine control module can bring the actual $\theta ci$ close to the target $\theta ci$ by adjusting the ignition timing according to a deviation of the actual $\theta ci$ from the target $\theta ci$. For example, while the actual $\theta ci$ is advanced exceeding the target $\theta ci$, the engine control module can retard the ignition timing, and, as a result of the actual $\theta ci$ being retarded, combustion noise can be reduced.

The present applicant has also proposed a technique for accurately estimating $\theta ci$ based on the signal of the in-cylinder pressure sensor.

In the engine which performs SPCCI combustion, the diagnosing the failure of the in-cylinder pressure sensor accurately makes it possible to reduce combustion noise and improve fuel efficiency.

The engine controller may be connected to a warning lamp provided to the automobile, and may cause the warning lamp to light up when the in-cylinder pressure sensor is determined to have failed.

DETAILED DESCRIPTION OF THE DISCLOSURE

Hereinafter, one embodiment of a failure diagnosis device for an in-cylinder pressure sensor will be described in detail with reference to the accompanying drawings. The following description is one example of the failure diagnosis device for the in-cylinder pressure sensor.

Figure 1:
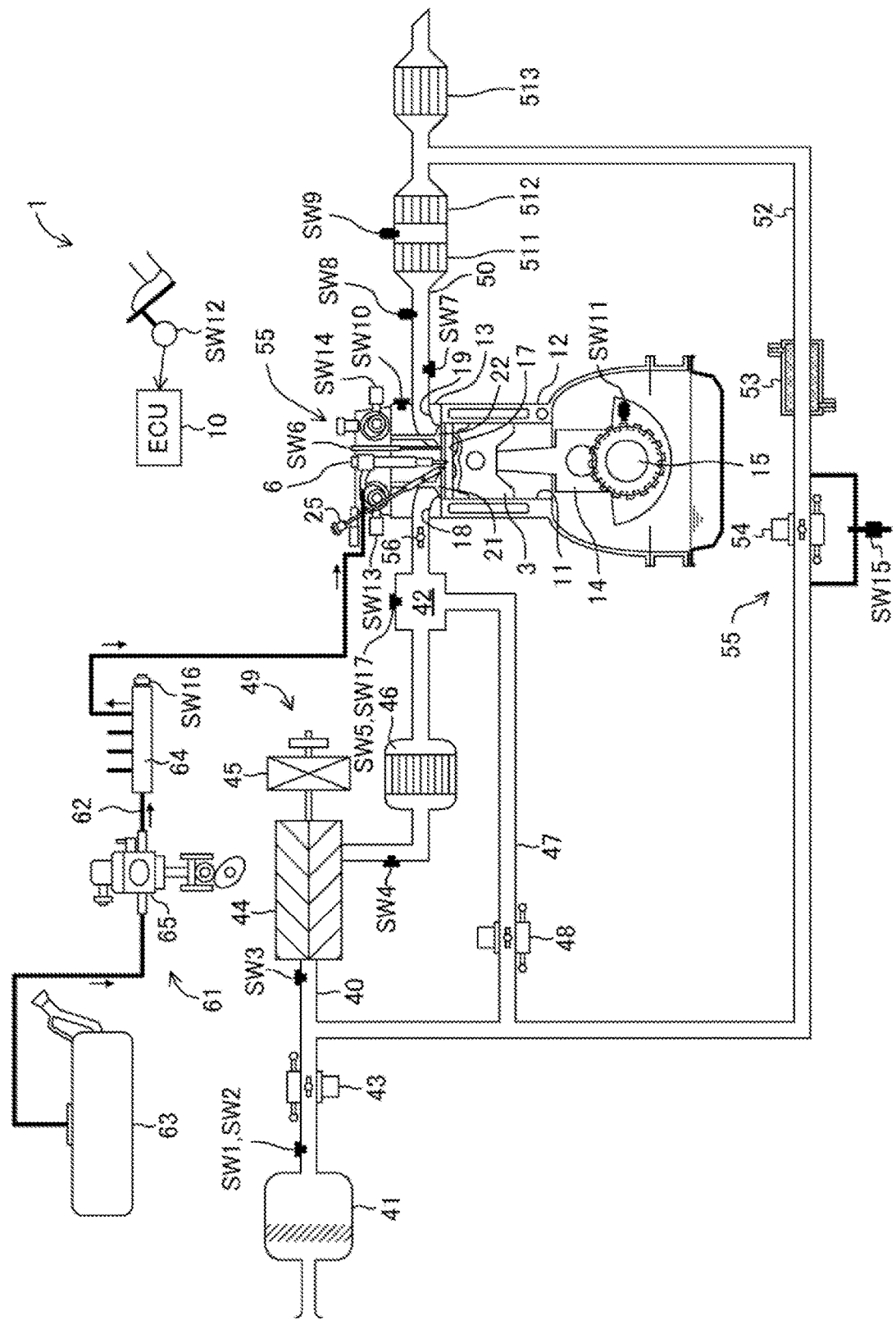
FIG. 1 is a view illustrating a configuration of an engine.
Figure 2:
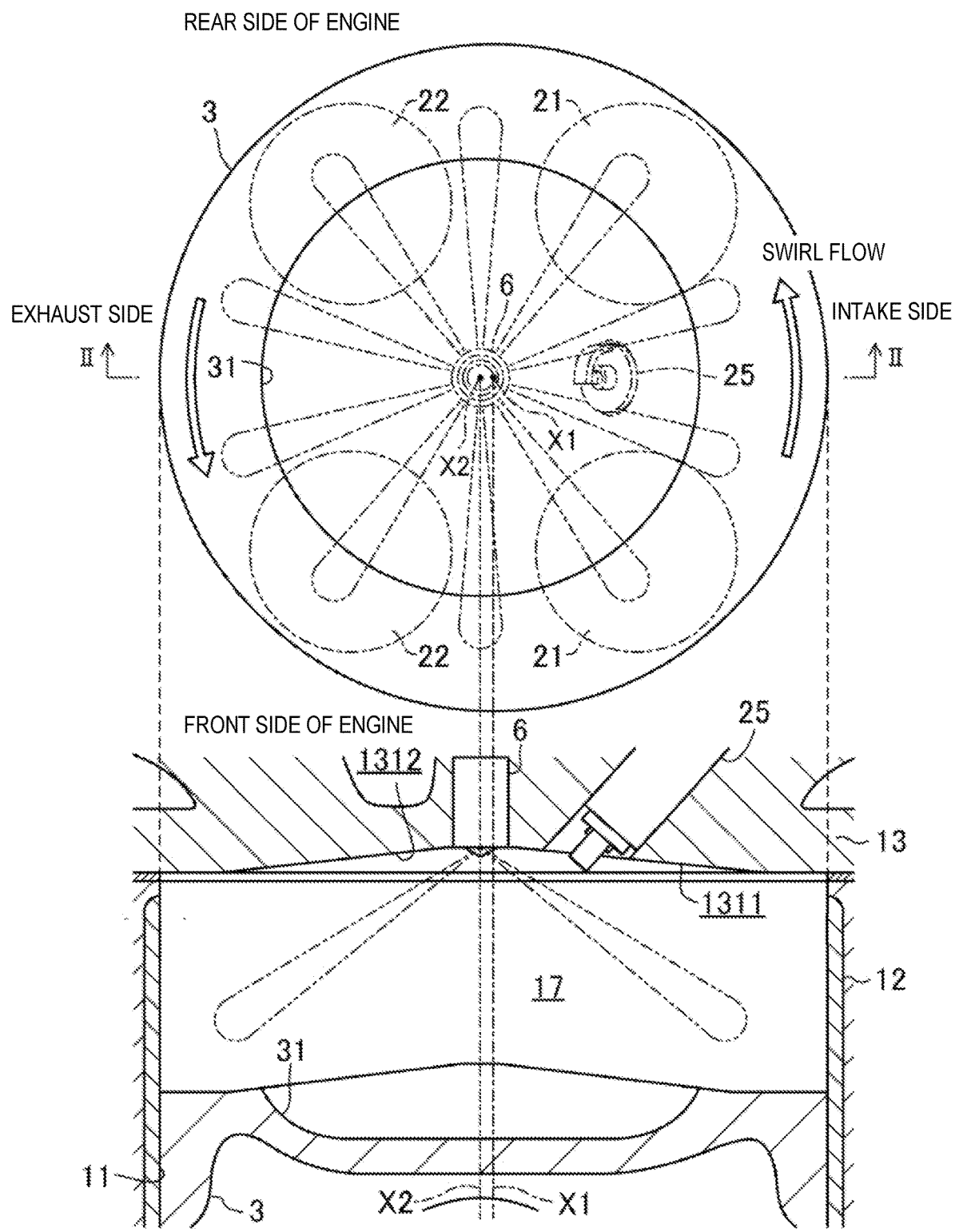
FIG. 2 is a view illustrating a configuration of a combustion chamber, where an upper drawing is a plan view of a combustion chamber, and a lower drawing is a cross-sectional view taken along a line II-II.
Figure 3:
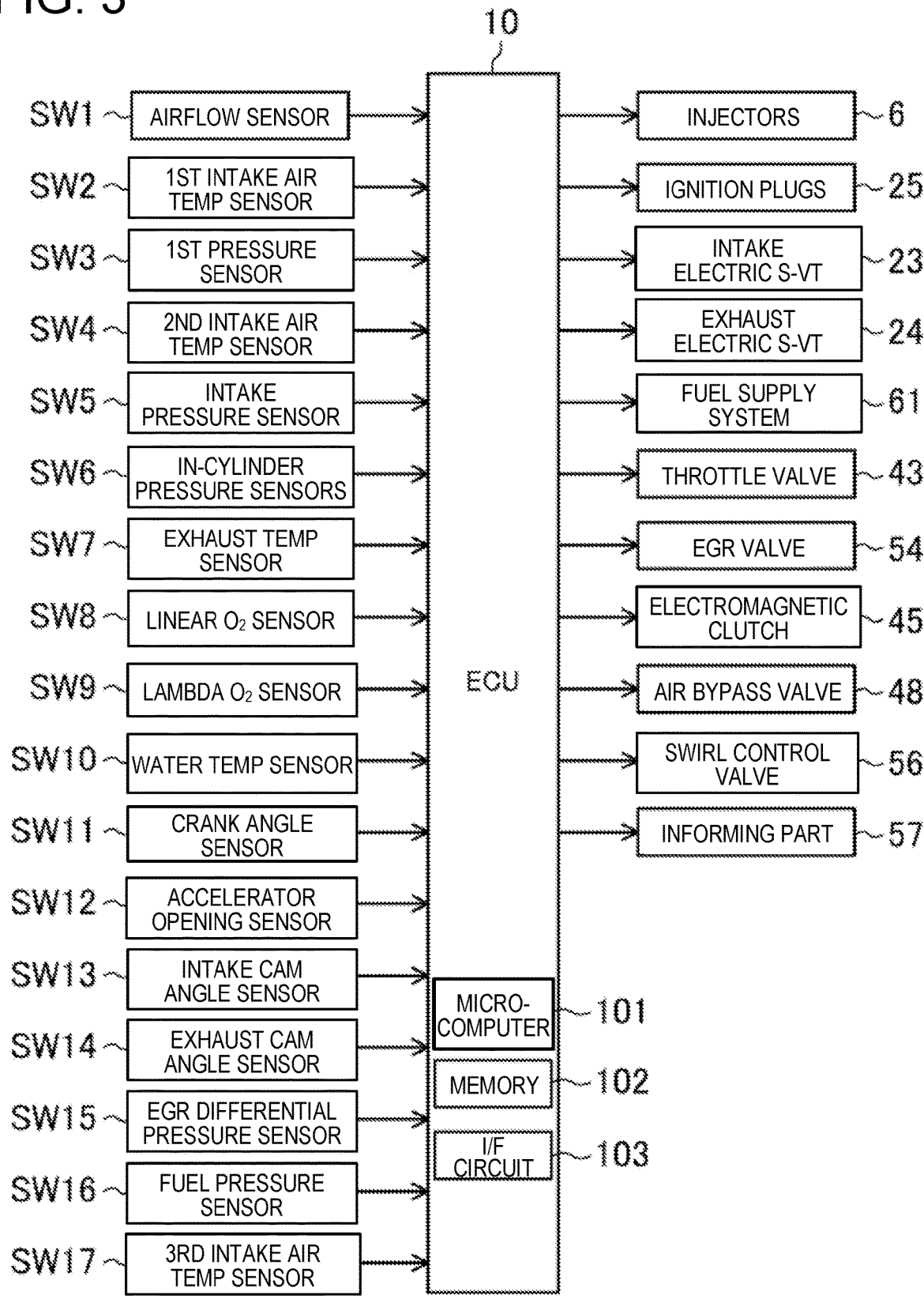
FIG. 3 is a block diagram illustrating a configuration of an engine control device.

FIG. 1 is a view illustrating a configuration of an engine of a compression ignition type provided with the failure diagnosis device for the in-cylinder pressure sensor. FIG. 2 is a view illustrating a configuration of a combustion chamber of the engine. Note that in FIG. 1, the intake side is on the left side, and the exhaust side is on the right side. In FIG. 2, the intake side is on the right side, and the exhaust side is on the left side. FIG. 3 is a block diagram illustrating a configuration of an engine control device.

An engine 1 is a four-stroke reciprocating engine which operates by a combustion chamber 17 repeating an intake stroke, a compression stroke, an expansion stroke, and an exhaust stroke. The engine 1 is mounted on an automobile with four wheels. The automobile travels by the operation of the engine 1. Fuel of the engine 1 is gasoline in this example. The fuel may be any liquid fuel which at least contains gasoline. For example, the fuel may be gasoline which contains bioethanol, etc.

(Configuration of Engine)

The engine 1 is provided with a cylinder block 12, and a cylinder head 13 placed thereon. A plurality of cylinders 11 are formed inside the cylinder block 12. In FIGS. 1 and 2, although only one cylinder 11 is illustrated, the engine 1 is a multi-cylinder engine in this example.

In each cylinder 11, a piston 3 is inserted so as to be slidable. The piston 3 is coupled to a crankshaft 15 through a connecting rod 14. The piston 3, the cylinder 11 and the cylinder head 13 define the combustion chamber 17. Note that the term "combustion chamber" as used herein may be used in a broader sense. That is, the "combustion chamber" may mean a space formed by the piston 3, the cylinder 11, and the cylinder head 13, regardless of the position of the piston 3. Moreover, in the following description, the term "in-cylinder" as used herein may also be used as a synonymous of the combustion chamber.

As illustrated in the lower drawing of FIG. 2, a lower surface of the cylinder head 13, i.e., a ceiling surface of the combustion chamber 17 is comprised of an inclined surface 1311 and an inclined surface 1312. The inclined surface 1311 is a rising gradient which rises from the intake side toward an axis X2 of an injector 6 (described later). The inclined surface 1312 is a rising gradient which rises from the exhaust side toward the axis X2 of the injector 6. The ceiling surface of the combustion chamber 17 is of a so-called "pent roof" shape.

An upper surface of the piston 3 bulges toward the ceiling surface of the combustion chamber 17. A cavity 31 is formed in the upper surface of the piston 3. The cavity 31 is dented from the upper surface of the piston 3. The cavity 31 has a shallow dish shape in this example. The center of the cavity 31 is offset on the exhaust side from a center axis X1 of the cylinder 11.

A geometric compression ratio of the engine 1 is set 10 or more and 30 or less. The engine 1 performs SPCCI (SPark Controlled Compression Ignition) combustion which is a combination of SI (spark ignition) combustion and CI (compressed ignition) combustion, as will be described later. SPCCI combustion controls CI combustion using a heat generation and a pressure buildup by SI combustion. The engine 1 is a compression ignition engine. However, this engine 1 does not have to make the temperature of the combustion chamber 17 high when the piston 3 reaches a compression top dead center. Thus, the engine 1 can set the geometric compression ratio comparatively low. If the geometric compression ratio can be made lower, it becomes advantageous to a reduction of cooling loss, and a reduction of mechanical loss. In a regular fuel specification (i.e., a low octane fuel of which the octane number is about 91), the geometric compression ratio of the engine 1 may be 14 to 17, and in a high-octane specification (i.e., a high octane fuel of which the octane number is about 96), the geometric compression ratio may also be 15 to 18.

An intake port 18 is formed in the cylinder head 13 for each cylinder 11. Although illustration is omitted, the intake port 18 includes two intake ports, a first intake port and a second intake port. The intake port 18 communicates with the combustion chamber 17. The intake port 18 is a so-called tumble port. That is, the intake port 18 has such a shape that a tumble flow is formed inside the combustion chamber 17.

An intake valve 21 is disposed in each intake port 18. The intake valve 21 opens and closes a channel between the combustion chamber 17 and each intake port 18. The intake valve 21 is opened and closed by a valve operating mechanism at a given timing. The valve operating mechanism may be a variable valve operating mechanism in which the valve timing and/or the valve lift is variable. In this example, as illustrated in FIG. 3, the variable valve operating mechanism has an intake electric S-VT (Sequential-Valve Timing) 23. The intake electric S-VT 23 continuously changes a phase of an intake cam shaft within a given range. The open timing and the close timing of the intake valve 21 change continuously. Note that the intake valve operating mechanism may have a hydraulic S-VT, instead of the electric S-VT.

An exhaust port 19 is formed also in the cylinder head 13 for each cylinder 11. The exhaust port 19 also has two exhaust ports of a first exhaust port and a second exhaust port. The exhaust port 19 communicates with the combustion chamber 17.

An exhaust valve 22 is disposed in each exhaust port 19. The exhaust valve 22 opens and closes a channel between the combustion chamber 17 and each exhaust port 19. The exhaust valve 22 is opened and closed by the valve operating mechanism at a given timing. This valve operating mechanism may be a variable valve operating mechanism in which the valve timing and/or the valve lift are variable. In this example, as illustrated in FIG. 3, the variable valve operating mechanism has an exhaust electric S-VT 24. The exhaust electric S-VT 24 continuously changes a phase of an exhaust cam shaft within a given range. The open timing and the close timing of the exhaust valve 22 change continuously. Note that the exhaust valve operating mechanism may have a hydraulic S-VT, instead of the electric S-VT.

The intake electric S-VT 23 and the exhaust electric S-VT 24 adjust a length of an overlap period where both the intake valve 21 and the exhaust valve 22 open. As the length of the overlap period becomes longer, the residual gas inside the combustion chamber 17 can be purged. Moreover, by adjusting the length of the overlap period, internal EGR (Exhaust Gas Recirculation) gas can be introduced into the combustion chamber 17. The intake electric S-VT 23 and the exhaust electric S-VT 24 constitute an internal EGR system. Note that the internal EGR system is not necessarily comprised of the S-VTs.

The injector 6 is attached to the cylinder head 13 for each cylinder 11. The injector 6 directly injects the fuel into the combustion chamber 17. The injector 6 is one example of a fuel injection part. The injector 6 is disposed at a location where the inclined surface 1311 and the inclined surface 1312 intersect with each other. As illustrated in FIG. 2, the axis X2 of the injector 6 is located on the exhaust side of the center axis X1 of the cylinder 11. The axis X2 of the injector 6 is parallel to the center axis X1. The axis X2 of the injector 6 coexists with the center of the cavity 31. The injector 6 opposes to the cavity 31. Note that the axis X2 of the injector 6 may coexist with the center axis X1 of the cylinder 11. In such a configuration, the axis X2 of the injector 6 may coexist with the center of the cavity 31.

Although detailed illustration of the injector 6 is omitted, it is comprised of a multi nozzle hole type fuel injection valve having a plurality of nozzle holes. As illustrated by a two-dot chain line in FIG. 2, the injector 6 injects the fuel so that fuel spray may spread radially from the center of the combustion chamber 17. In this example, the injector 6 has ten nozzle holes, and the nozzle holes are arranged so as to be equally spaced in the circumferential direction.

The injector 6 is connected to a fuel supply system 61. The fuel supply system 61 includes a fuel tank 63, and a fuel supply path 62 which connects the fuel tank 63 to the injector 6. The fuel tank 63 stores the fuel. A fuel feed pump 65 and a common rail 64 are provided in the fuel supply path 62. The fuel feed pump 65 pumps the fuel to the common rail 64. In this example, the fuel feed pump 65 is a plunger-type pump driven by the crankshaft 15. The common rail 64 stores at a high fuel pressure the fuel which is pumped from the fuel feed pump 65. When the injector 6 opens, the fuel stored inside the common rail 64 is injected into the combustion chamber 17 from the nozzle holes of the injector 6. The fuel supply system 61 is capable of supplying the fuel at the high pressure of 30 MPa or higher to the injector 6. The pressure of the fuel supplied to the injector 6 may be changed according to the operating state of the engine 1. Note that the configuration of the fuel supply system 61 is not limited to the configuration described above.

An ignition plug 25 is attached to the cylinder head 13 for each cylinder 11. The ignition plug 25 forcibly ignites mixture gas inside the combustion chamber 17. The ignition plug 25 is one example of an ignition part. In this example, the ignition plug 25 is disposed on the intake side of the center axis X1 of the cylinder 11. The ignition plug 25 is located between the two intake ports 18. The ignition plug 25 is attached to the cylinder head 13 so as to be inclined from above to below in a direction toward the center of the combustion chamber 17. As illustrated in FIG. 2, an electrode of the ignition plug 25 projects into the combustion chamber 17 and is located near the ceiling surface of the combustion chamber 17. Note that the ignition plug 25 may be disposed on the exhaust side of the center axis X1 of the cylinder 11. Moreover, the ignition plug 25 may be disposed on the center axis X1 of the cylinder 11.

An intake passage 40 is connected to one side surface of the engine 1. The intake passage 40 communicates with the intake port 18 of each cylinder 11. The gas to be entered into the combustion chamber 17 flows through the intake passage 40. An air cleaner 41 is disposed at an upstream end of the intake passage 40. The air cleaner 41 filters fresh air. A surge tank 42 is disposed near a downstream end of the intake passage 40. A part of the intake passage 40 downstream of the surge tank 42 constitutes an independent passage which branches for each cylinder 11. A downstream end of the independent passage is connected to the intake port 18 of each cylinder 11.

A throttle valve 43 is disposed between the air cleaner 41 and the surge tank 42 in the intake passage 40. The throttle valve 43 adjusts an amount of the fresh air introduced into the combustion chamber 17 by adjusting an opening of the valve thereof.

A supercharger 44 is disposed in the intake passage 40 downstream of the throttle valve 43. The supercharger 44 boosts the gas entering into the combustion chamber 17. In this example, the supercharger 44 is a mechanical supercharger driven by the engine 1. The mechanical supercharger 44 may be roots type, Lysholm type, vane type, or centrifugal type.

An electromagnetic clutch 45 is provided between the supercharger 44 and the engine 1. The electromagnetic clutch 45 transmits or intercepts a driving force from the engine 1 to the supercharger 44 between the supercharger 44 and the engine 1. By an ECU 10 switching the interception (disengagement) and the connection (engagement) of the electromagnetic clutch 45, ON/OFF of the supercharger 44 is switched, as will be described later.

An intercooler 46 is disposed in the intake passage 40 downstream of the supercharger 44. The intercooler 46 cools gas compressed by the supercharger 44. The intercooler 46 may be, for example, a water cooling type or an oil cooling type.

The intake passage 40 is connected to a bypass passage 47. The bypass passage 47 connects a part of the intake passage 40 upstream of the supercharger 44 to a part downstream of the intercooler 46. The bypass passage 47 bypasses the supercharger 44 and the intercooler 46. An air by-pass valve 48 is disposed in the bypass passage 47. The air by-pass valve 48 adjusts a flow rate of gas flowing through the bypass passage 47.

The ECU 10 causes the air by-pass valve 48 to fully open, when the supercharger 44 is turned OFF (i.e., when the electromagnetic clutch 45 is disengaged or released). The gas flowing through the intake passage 40 bypasses the supercharger 44 and enters into the combustion chamber 17. The engine 1 operates in a non-boosting state, i.e., a natural aspiring state.

When the supercharger 44 is turned ON, the engine 1 operates in a boosting state. The ECU 10 adjusts an opening of the air by-pass valve 48, when the supercharger 44 is turned ON (i.e., when the electromagnetic clutch 45 is engaged or connected). A portion of gas which passed the supercharger 44 flows back upstream of the supercharger 44 through the bypass passage 47. When the ECU 10 adjusts the opening of the air by-pass valve 48, the pressure of the gas entering into the combustion chamber 17 varies. That is, a boost pressure varies. Note that a phrase "during the boost" as used herein may refer to time when the pressure inside the surge tank 42 exceeds the atmospheric pressure, and a phrase "during the non-boost" as used herein may refer to time when the pressure inside the surge tank 42 becomes lower than the atmospheric pressure.

In this example, a supercharging system 49 is comprised of the supercharger 44, the bypass passage 47, and the air by-pass valve 48.

The engine 1 has a swirl generating part which generates a swirl flow inside the combustion chamber 17. The swirl flow flows as illustrated by white arrows in FIG. 2. The swirl generating part has a swirl control valve 56 attached to the intake passage 40. Although detailed illustration of the swirl control valve 56 is omitted, it is disposed in a secondary passage, among a primary passage connected with one of the two intake ports 18 and the secondary passage connected with the other intake port 18. The swirl control valve 56 is an opening controllable valve in which a cross-section of the secondary passage can be choked. When the opening of the swirl control valve 56 is small, since a flow rate of intake air entering into the combustion chamber 17 from one intake port 18 is relatively large, and on the other hand, a flow rate of intake air entering into the combustion chamber 17 from the other intake port 18 is relatively small, the swirl flow inside the combustion chamber 17 becomes stronger. When the opening of the swirl control valve 56 is large, since flow rates of intake air entering into the combustion chamber 17 from the two intake ports 18 become equal, the swirl flow inside the combustion chamber 17 becomes weaker. When the swirl control valve 56 is fully opened, the swirl flow does not occur.

An exhaust passage 50 is connected to the other side surface of the engine 1. The exhaust passage 50 communicates with the exhaust port 19 of each cylinder 11. The exhaust passage 50 is a passage through which the exhaust gas discharged from the combustion chamber 17 flows. Although the detailed illustration of an upstream part of the exhaust passage 50 is omitted, it constitutes an independent passage which branches for each cylinder 11. An upstream end of the independent passage is connected to the exhaust port 19 of each cylinder 11.

An exhaust gas purification system having a plurality of catalytic converters is disposed in the exhaust passage 50. The upstream catalytic converter is disposed inside an engine bay, although the corresponding illustration is omitted. The upstream catalytic converter has a three-way catalyst 511 and a GPF (Gasoline Particulate Filter) 512. The downstream catalytic converter is disposed outside the engine bay. The downstream catalytic converter has a three-way catalyst 513. Note that the exhaust gas purification system is not limited to the configuration of the illustrated example. For example, the GPF may be omitted. Moreover, the catalytic converter is not limited to what has the three-way catalyst. Further, the arranged order of the three-way catalyst and GPF may be suitably changed.

An EGR passage 52 is connected between the intake passage 40 and the exhaust passage 50. The EGR passage 52 is a passage for recirculating a part of exhaust gas to the intake passage 40. The EGR passage 52 constitutes an external EGR system. An upstream end of the EGR passage 52 is connected to the exhaust passage 50 between the upstream catalytic converter and the downstream catalytic converter. A downstream end of the EGR passage 52 is connected to the part of the intake passage 40 upstream of the supercharger 44. EGR gas flowing through the EGR passage 52 enters into the part of the intake passage 40 upstream of the supercharger 44, without passing through the air by-pass valve 48 in the bypass passage 47.

An EGR cooler 53 of a water cooling type is disposed in the EGR passage 52. The EGR cooler 53 cools exhaust gas. An EGR valve 54 is also disposed in the EGR passage 52. The EGR valve 54 adjusts a flow rate of exhaust gas flowing through the EGR passage 52. By adjusting the opening of the EGR valve 54, a recirculating amount of the cooled exhaust gas (i.e., external EGR gas) can be adjusted.

This engine 1 has the external EGR system and the internal EGR system, as an EGR system 55. The external EGR system can supply exhaust gas to the combustion chamber 17 at a lower temperature than that of the internal EGR system.

The control device of the compression ignition engine 1 is provided with the ECU (Engine Control Unit) 10 for operating the engine 1. The ECU 10 is an engine controller based on a well-known microcomputer, and as illustrated in FIG. 3, it includes a microcomputer 101 having a processor such as a central processing unit (CPU) which executes programs, a memory 102 which is comprised of, for example, RAM (Random Access Memory) and ROM (Read Only Memory) and stores the programs and data, and an interface (I/F) circuit 103 which outputs and inputs an electrical signal.

As illustrated in FIGS. 1 and 3, the ECU 10 is connected to various kinds of sensors SW1-SW17. Each of the sensors SW1-SW17 outputs a signal to the ECU 10. The sensors include the following sensors.

Airflow sensor SW1: Disposed in the intake passage 40 downstream of the air cleaner 41 and outputs a signal corresponding to the flow rate of fresh air flowing through the intake passage 40;

First intake air temperature sensor SW2: Disposed in the intake passage 40 downstream of the air cleaner 41 and outputs a signal corresponding to the temperature of fresh air flowing through the intake passage 40;

First pressure sensor SW3: Disposed in the intake passage 40 downstream of the connected position of the EGR passage 52 and upstream of the supercharger 44, and outputs a signal corresponding to the pressure of gas entering into the supercharger 44;

Second intake air temperature sensor SW4: Disposed in the intake passage 40 downstream of the supercharger 44 and upstream of the connected position of the bypass passage 47, and outputs a signal corresponding to the temperature of gas flowed out of the supercharger 44;

Intake pressure sensor SW5: Attached to the surge tank 42 and outputs a signal corresponding to the pressure of gas downstream of the supercharger 44;

In-cylinder pressure sensor SW6: Attached to the cylinder head 13 corresponding to each cylinder 11 and outputs a signal corresponding to the pressure inside each combustion chamber 17;

Exhaust temperature sensor SW7: Disposed in the exhaust passage 50 and outputs a signal corresponding to the temperature of exhaust gas discharged from the combustion chamber 17;

Linear $O_2$ sensor SW8: Disposed in the exhaust passage 50 upstream of the upstream catalytic converter and outputs a signal corresponding to oxygen concentration in exhaust gas;

Lambda $O_2$ sensor SW9: Disposed downstream of the three-way catalyst 511 of the upstream catalytic converter and outputs a signal corresponding to the oxygen concentration in exhaust gas;

Water temperature sensor SW10: Attached to the engine 1 and outputs a signal corresponding to the temperature of cooling water;

Crank angle sensor SW11: Attached to the engine 1 and outputs a signal corresponding to a rotation angle of the crankshaft 15;

Accelerator opening sensor SW12: Attached to an accelerator mechanism and outputs a signal corresponding to an accelerator opening proportional to an operating amount of the accelerator;

Intake cam angle sensor SW13: Attached to the engine 1 and outputs a signal corresponding to a rotation angle of the intake cam shaft;

Exhaust cam angle sensor SW14: Attached to the engine 1 and outputs a signal corresponding to a rotation angle of the exhaust cam shaft;

EGR differential pressure sensor SW15: Disposed in the EGR passage 52 and outputs a signal corresponding to a differential pressure between upstream and downstream of the EGR valve 54;

Fuel pressure sensor SW16: Attached to the common rail 64 of the fuel supply system 61 and outputs a signal corresponding to the pressure of fuel supplied to the injector 6; and Third intake air temperature sensor SW17: Attached to the surge tank 42 and outputs a signal corresponding to the temperature of gas inside the surge tank 42, i.e., the temperature of intake air entering into the combustion chamber 17.

The ECU 10 determines the operating state of the engine 1 based on the signals from the sensors SW1-SW17, and calculates a control amount of each device according to predefined control logic. The control logic is stored in the memory 102. The control logic includes calculating target amounts and/or the control amounts by using a map stored in the memory 102.

The ECU 10 outputs electrical signals according to the calculated control amounts to the injectors 6, the ignition plugs 25, the intake electric S-VT 23, the exhaust electric S-VT 24, the fuel supply system 61, the throttle valve 43, the EGR valve 54, the electromagnetic clutch 45 of the supercharger 44, and the air by-pass valve 48 and the swirl control valve 56.

For example, the ECU 10 sets a target torque of the engine 1 based on the signal from the accelerator opening sensor SW12 and the map, and determines a target boost pressure. Then, the ECU 10 performs a feedback control for adjusting the opening of the air by-pass valve 48 based on the target boost pressure and the differential pressure before and after the supercharger 44 obtained from the signals of the first pressure sensor SW3 and the intake pressure sensor SW5. By this feedback control, the boost pressure becomes the target boost pressure.

Moreover, the ECU 10 sets a target EGR ratio (i.e., a ratio of EGR gas to all the gas inside the combustion chamber 17) based on the operating state of the engine 1 and the map. Then, the ECU 10 determines a target EGR gas amount based on the target EGR ratio and an intake air amount based on the signal from the accelerator opening sensor SW12, and performs a feedback control for adjusting the opening of the EGR valve 54 based on the differential pressure before and after the EGR valve 54 obtained from the signal of the EGR differential pressure sensor SW15. By this feedback control, the external EGR gas amount entering into the combustion chamber 17 becomes the target EGR gas amount.

Further, the ECU 10 performs an air-fuel ratio feedback control, when a given control condition is satisfied. Specifically, based on the oxygen concentrations in exhaust gas obtained from the signals of the linear $O_2$ sensor SW8 and the lambda $O_2$ sensor SW9, the ECU 10 adjusts a fuel injection amount of the injector 6 so that the air-fuel ratio of mixture gas becomes a desired value.

Note that the details of other controls of the engine 1 performed by the ECU 10 will be described later.

The ECU 10 is connected to an informing device 57. The informing device 57 is comprised of, for example, a warning lamp provided to an instrument panel. As will be described later, when a failure diagnosis device 100 for the in-cylinder pressure sensor SW6 diagnoses a failure of the in-cylinder pressure sensor SW6, the informing device 57 informs a user of the failure.

(Configuration of in-Cylinder Pressure Sensor)

Figure 4:
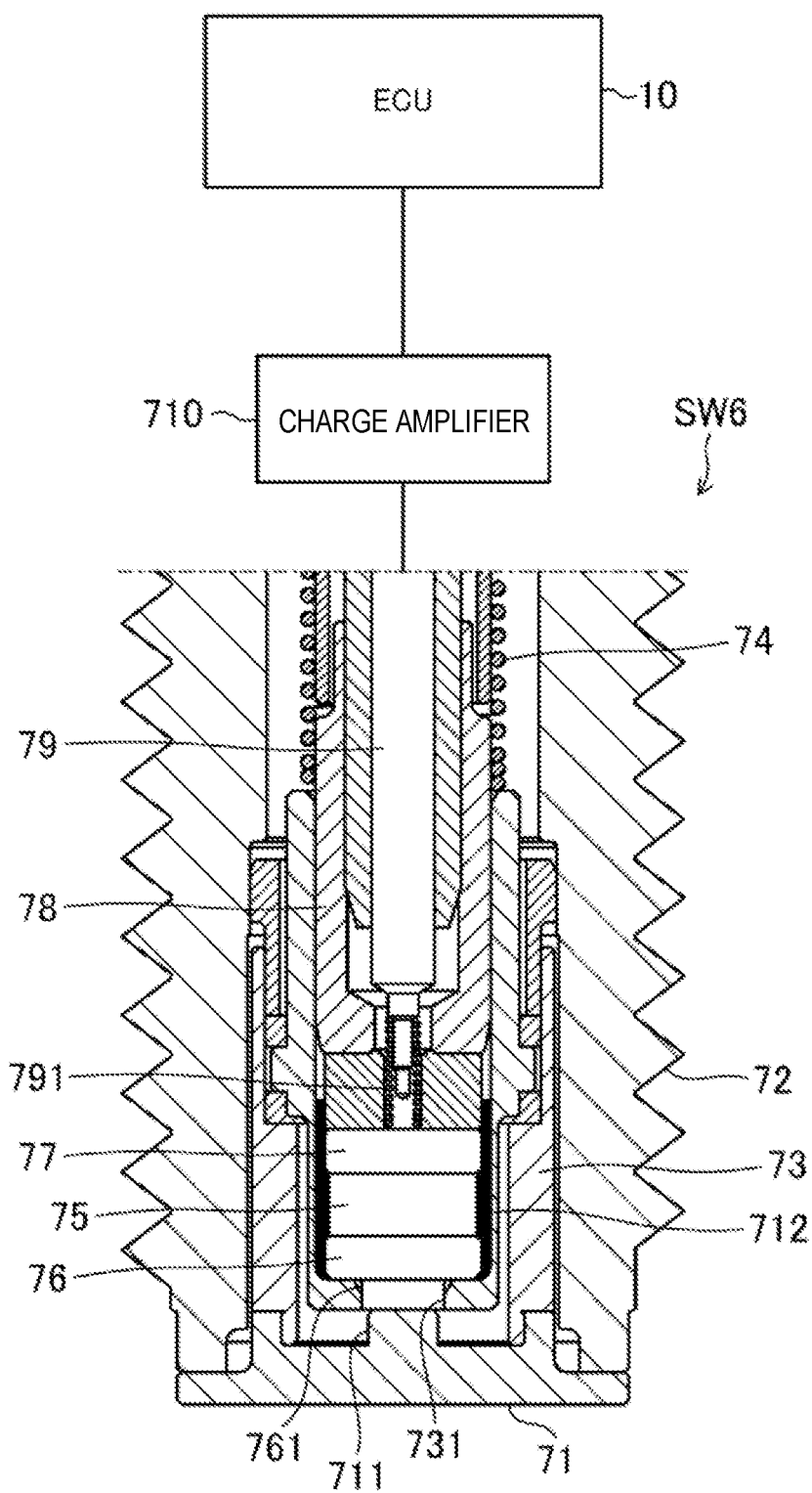
FIG. 4 is a cross-sectional view illustrating a configuration of an in-cylinder pressure sensor.

FIG. 4 illustrates a configuration of the in-cylinder pressure sensor SW6. The in-cylinder pressure sensor SW6 has a diaphragm 71 disposed so as to face to the inside of the combustion chamber 17. The diaphragm 71 is made of material having flexibility. The diaphragm 71 is disposed at a tip end of the in-cylinder pressure sensor SW6. A circumferential edge of the diaphragm 71 is supported by a housing. The housing is comprised of an outer housing 72 and an inner housing 73. When the pressure inside the combustion chamber 17 increases, the pressure pushes an external surface of the diaphragm 71 so that a central part of the diaphragm 71 which is not supported by the outer housing 72 and the inner housing 73 is bent.

The outer housing 72 is fixed to the cylinder head 13 of the engine 1, although the corresponding illustration is omitted. The outer housing 72 is cylindrical in which a tip end thereof is opened. The diaphragm 71 is attached to a tip-end face of the outer housing 72. The circumferential edge of the diaphragm 71 is fixed to the outer housing 72 by welding.

The inner housing 73 is fitted into the outer housing 72. The inner housing 73 is located at a tip-end part of the outer housing 72. The inner housing 73 is comprised of a combination of a plurality of parts. The inner housing 73 is also cylindrical. The circumferential edge of the diaphragm 71 is also fixed to the inner housing 73 by welding.

The inner housing 73 is biased by a biasing member 74 toward the tip end of the in-cylinder pressure sensor SW6.

The biasing member 74 is disposed inside the outer housing 72, on a base-end side of the in-cylinder pressure sensor SW6 from the inner housing 73 (i.e., upward in FIG. 4).

A piezo-electric element 75 is disposed inside the inner housing 73. The piezo-electric element 75 is deformed by the diaphragm 71 being bent, and outputs a weak current corresponding to an amount of the deformation.

A pedestal 76 is attached to a tip-end part of the piezo-electric element 75. The pedestal 76 has a protrusion 761 in the central part thereof, which protrudes toward the tip end of the in-cylinder pressure sensor SW6. The protrusion 761 is located inside a through-hole 731 provided to a tip-end part of the inner housing 73.

A central protrusion 711 which protrudes toward the base end of the in-cylinder pressure sensor SW6 is provided to a central part on inner surface of the diaphragm 71, integrally with the diaphragm 71. The central protrusion 711 of the diaphragm 71 contacts the protrusion 761 of the pedestal 76. When the central part of the diaphragm 71 is bent, the pedestal 76 is pushed by the central protrusion 711 toward the base end of the in-cylinder pressure sensor SW6, thereby deforming the piezo-electric element 75.

An electrode 77 is attached to a base-end part of the piezo-electric element 75. The weak current of the piezo-electric element 75 is outputted through the electrode 77.

A base-end part of the electrode 77 is supported by an electrode support part 78. The electrode support part 78 is also comprised of a combination of a plurality of members. The electrode support part 78 is welded to the inner housing 73. An electrically conductive part 79 is disposed inside the electrode support part 78. The electrically conductive part 79 extends toward the base end of the in-cylinder pressure sensor SW6. A base end of the electrically conductive part 79 is connected to a charge amplifier 710 provided to the in-cylinder pressure sensor SW6. The charge amplifier 710 amplifies the weak current of the piezo-electric element 75 and outputs it to the ECU 10.

A compression spring 791 is disposed between the electrode 77 and the electrically conductive part 79. The compression spring 791 electrically connects between the electrode 77 and the electrically conductive parts 79.

An annular insulating part 712 is provided between an integrated part comprised of the pedestal 76, the piezo-electric element 75 and the electrode 77, and the inner housing 73. In FIG. 4, the insulating part 712 is a portion colored in black.

(Concept of SPCCI Combustion)

The engine 1 performs combustion by compression self-ignition in a given operating state, mainly for the purpose of an improvement of fuel efficiency and an improvement of exhaust emission performance. The combustion by self-ignition largely changes at the timing of self-ignition, when the temperature inside the combustion chamber 17 varies before the compression is started. Thus, the engine 1 performs SPCCI combustion which is a combination of SI combustion and CI combustion.

SPCCI combustion is a form of combustion in which the ignition plug 25 forcibly ignites a mixture gas inside the combustion chamber 17 to cause the mixture gas to carry out SI combustion by flame propagation, and when the temperature inside the combustion chamber 17 increases by heat generated by the SI combustion and the pressure inside the combustion chamber 17 increases by flame propagation, unburnt mixture gas carries out CI combustion by self-ignition.

By adjusting an amount of the heat generation of SI combustion, the variation in the temperature inside the combustion chamber 17 before the compression is started is absorbable. By the ECU 10 adjusting an ignition timing, mixture gas can be self-ignited at a target timing.

Figure 5:
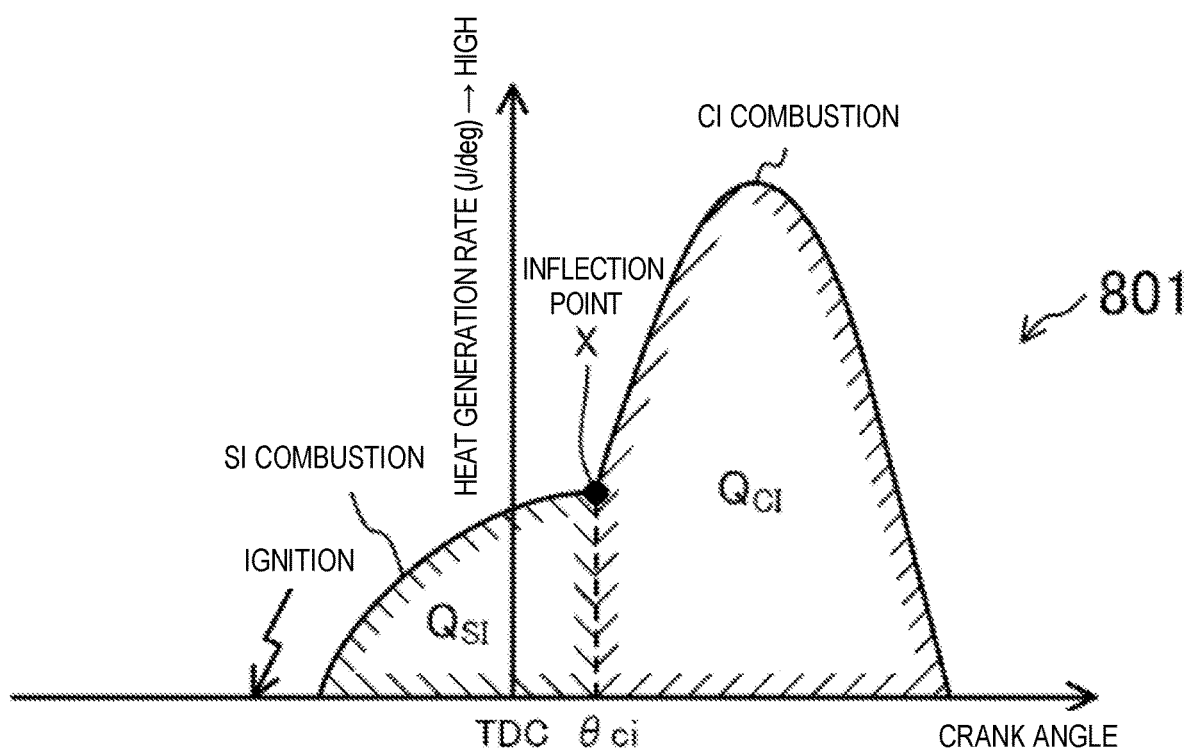
FIG. 5 is a graph illustrating a waveform of SPCCI combustion.

In SPCCI combustion, the heat generation during SI combustion is milder than the heat generation during CI combustion. As illustrated in FIG. 5, in a waveform of a heat generation rate $(dQ/d\theta)$ of SPCCI combustion, SI combustion is smaller in the rising slope than CI combustion. Moreover, a rate of pressure fluctuation inside the combustion chamber 17 $(dp/d\theta)$ of SI combustion also becomes milder than that of CI combustion.

When the unburnt mixture gas carries out self-ignition after the start of SI combustion, the waveform slope of the heat generation rate may change from small to large at the timing of self-ignition. The waveform of the heat generation rate may have a point of inflection X at the timing when CI combustion starts.

After the start of CI combustion, SI combustion and CI combustion are performed in parallel. Since the heat generation is larger during CI combustion than SI combustion, the heat generation rate becomes relatively high. However, since CI combustion is performed after the compression top dead center, it is avoided that the waveform slope of the heat generation rate becomes excessively large. The rate of pressure fluctuation $(dp/d\theta)$ also becomes comparatively mild during CI combustion.

The rate of pressure fluctuation $(dp/d\theta)$ can be used as an index indicative of combustion noise. As described above, since SPCCI combustion can reduce the rate of pressure fluctuation $(dp/d\theta)$, it becomes possible to avoid the combustion noise becoming excessively large. The combustion noise of the engine 1 is lowered within an allowable level.

SPCCI combustion is finished when CI combustion ends. CI combustion is shorter in the combustion period than SI combustion. The combustion end timing is earlier in SPCCI combustion than in SI combustion.

The waveform of the heat generation rate in SPCCI combustion is formed so that a first heat generation part $Q_{SI}$ formed by SI combustion, and a second heat generation part $Q_{CI}$ formed by CI combustion continue in this order.

Here, a SI ratio is defined as a parameter indicative of a characteristic of SPCCI combustion. The SI ratio is herein defined as an index related to a ratio of the heat amount generated by SI combustion to all the heat amount generated by SPCCI combustion. The SI ratio is a heat amount ratio generated by two types of combustion of different combustion forms. When the SI ratio is high, the ratio of SI combustion is high, and when the SI ratio is low, the ratio of CI combustion is high. If the ratio of SI combustion in SPCCI combustion is high, it becomes advantageous to the reduction of combustion noise. If the ratio of CI combustion in SPCCI combustion is high, it becomes advantageous to the improvement of fuel efficiency of the engine 1.

The SI ratio may be defined as a ratio of the heat amount generated by SI combustion to the heat amount generated by CI combustion. That is, in SPCCI combustion where a crank angle at which CI combustion starts is set as a CI combustion start timing $\theta ci$, SI ratio$=Q_{SI}/Q_{CI}$ from an SI combustion area $Q_{SI}$ on an advance side of $\theta ci$, and a CI combustion area $Q_{CI}$ including $\theta ci$ and on a retard side of $\theta ci$, in a waveform 801 illustrated in FIG. 5.

(Engine Control Logic)

Figure 6:
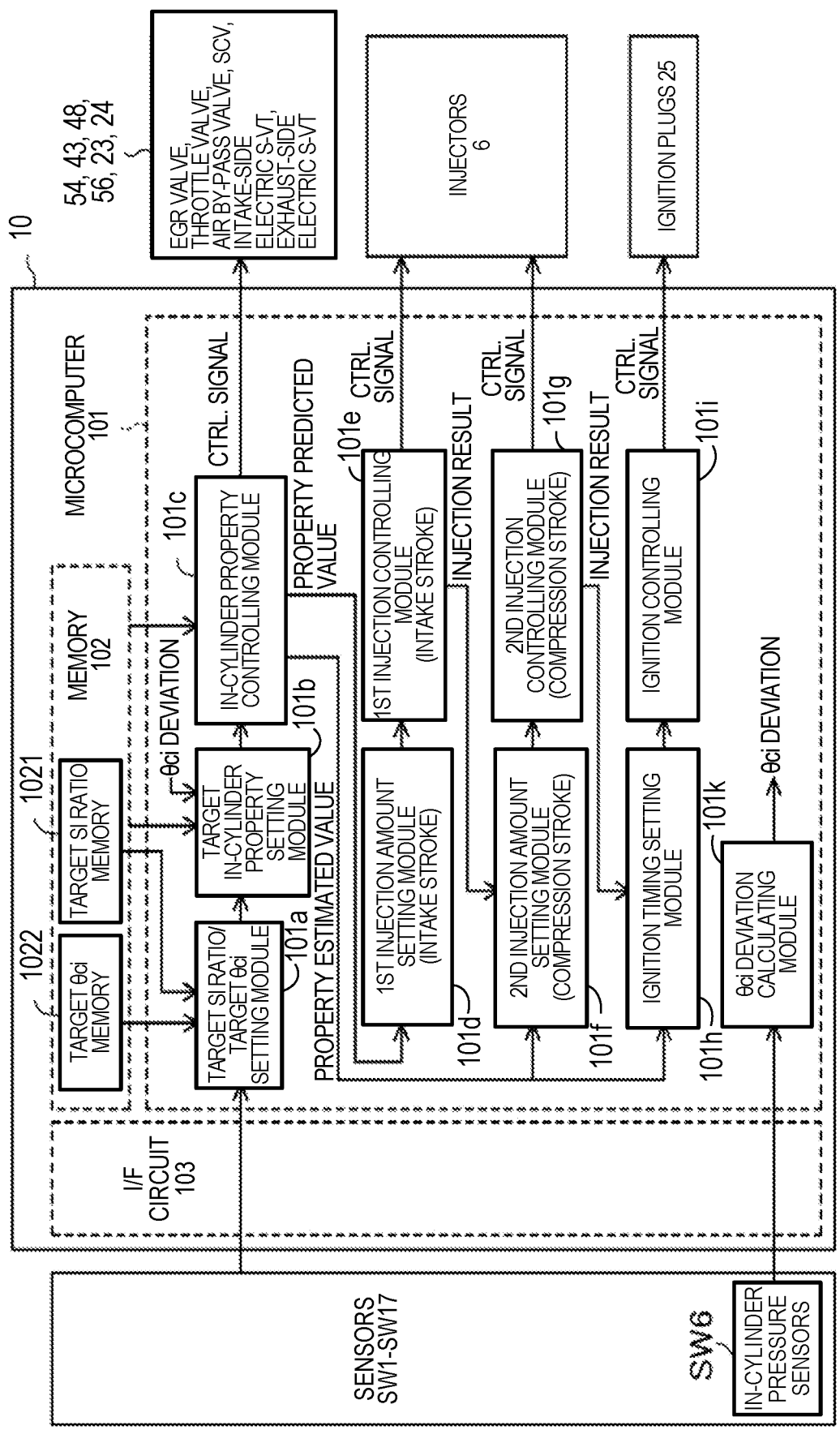
FIG. 6 is a block diagram illustrating a functional configuration of an engine controller.

FIG. 6 is a block diagram illustrating a functional configuration of the ECU 10 which performs the control logic of the engine 1. The ECU 10 operates the engine 1 according to the control logic stored in the memory 102. Specifically, the ECU 10 determines the operating state of the engine 1 based on the signals from the sensors SW1-SW17, and performs calculations for adjusting the properties inside the combustion chamber 17, the injection amount, an injection timing, and the ignition timing so that the combustion inside the combustion chamber 17 becomes the combustion of the SI ratio according to the operating state.

The ECU 10 controls SPCCI combustion using two parameters of the SI ratio and $\theta ci$. Specifically, the ECU 10 defines a target SI ratio and a target $\theta ci$ corresponding to the operating state of the engine 1, and adjusts the temperature inside the combustion chamber 17 and the ignition timing so that an actual SI ratio becomes the target SI ratio and an actual $\theta ci$ becomes the target $\theta ci$. The temperature inside the combustion chamber 17 is adjusted by adjusting the temperature and/or the amount of exhaust gas entering into the combustion chamber 17.

The ECU 10 first reads the signals from the sensors SW1-SW17 through the I/F circuit 103. Next, a target SI ratio/target $\theta ci$ setting module 101a of the microcomputer 101 of the ECU 10 determines the operating state of the engine 1 based on the signals from the sensors SW1-SW17, and sets the target SI ratio (i.e., the target heat amount ratio) and the target CI combustion start timing $\theta ci$. The target SI ratio is defined according to the operating state of the engine 1. The target SI ratio is stored in a target SI ratio memory 1021 of the memory 102. The target SI ratio/target $\theta ci$ setting module 101a sets the target SI ratio low when the load of the engine 1 is low, and on the other hand, it sets the target SI ratio high when the load of the engine 1 is high. When the load of the engine 1 is low, both the reduction of combustion noise and the improvement of fuel efficiency can be achieved by increasing the ratio of CI combustion in SPCCI combustion. On the other hand, when the load of the engine 1 is high, it becomes advantageous to the reduction of combustion noise by increasing the ratio of SI combustion in SPCCI combustion.

As described above, $\theta ci$ means the crank angle timing when CI combustion starts in SPCCI combustion (see FIG. 5). The target $\theta ci$ is also defined according to the operating state of the engine 1. The target $\theta ci$ is stored in a target $\theta ci$ memory 1022 of the memory 102. Combustion noise can be reduced if $\theta ci$ is on the retard side. Fuel efficiency of the engine 1 can be improved if $\theta ci$ is on the advance side. The target $\theta ci$ is set as much as possible to the advance side within the range where combustion noise can be kept within the allowable level.

A target in-cylinder property setting module 101b sets target in-cylinder properties for realizing the set target SI ratio and target $\theta ci$ based on a model stored in the memory 102. Specifically, the target in-cylinder property setting module 101b sets a target temperature, a target pressure, and other target properties inside the combustion chamber 17.

An in-cylinder property controlling module 101c sets the opening of the EGR valve 54, the opening of the throttle valve 43, the opening of the air by-pass valve 48, the opening of the swirl control valve 56, a phase angle of the intake electric S-VT 23 (i.e., a valve timing of the intake valve 21), and a phase angle of the exhaust electric S-VT 24 (i.e., a valve timing of the exhaust valve 22), which are required for realizing the target in-cylinder properties. The in-cylinder property controlling module 101c sets the control amounts of these devices based on the map stored in the memory 102. The in-cylinder property controlling module 101c outputs control signals to the EGR valve 54, the throttle valve 43, the air by-pass valve 48, the swirl control valve (SCV) 56, the intake electric S-VT 23, and the exhaust electric S-VT 24 based on the set control amounts. By each device operating based on the signal of the ECU 10, the property inside the combustion chamber 17 becomes the target property.

Further, the in-cylinder property controlling module 101c calculates a predicted value of the property, and an estimated value of the property inside the combustion chamber 17 based on the set control amount of each device. The property predicted value is a value obtained by predicting the property inside the combustion chamber 17 before the intake valve 21 is closed. The property predicted value is used for setting the injection amount of the fuel on the intake stroke, as will be described later. The property estimated value is a value obtained by estimating the property inside the combustion chamber 17 after the intake valve 21 is closed. The property estimated value is used for setting the injection amount of the fuel on the compression stroke, and the ignition timing, as will be described later.

A first injection amount setting module 101d sets the injection amount of the fuel on the intake stroke based on the property predicted value. When performing a divided injection on the intake stroke, an injection amount of each divided injection is set. Note that if the injection of the fuel is not performed on the intake stroke, the first injection amount setting module 101d sets the injection amount of the fuel to zero. A first injection controlling module 101e outputs the control signal to the injector 6 so that the injector 6 injects the fuel into the combustion chamber 17 at a given injection timing. The first injection controlling module 101e outputs an injection result of the fuel on the intake stroke.

A second injection amount setting module 101f sets the injection amount of the fuel on the compression stroke based on the property estimated value and the injection result of the fuel on the intake stroke. Note that when not injecting the fuel on the compression stroke, the second injection amount setting module 101f sets the injection amount of the fuel to zero. A second injection controlling module 101g outputs the control signal to the injector 6 so that the injector 6 injects the fuel into the combustion chamber 17 at an injection timing based on the preset map. The second injection controlling module 101g outputs an injection result of the fuel on the compression stroke.

An ignition timing setting module 101h sets an ignition timing based on the property estimated value and the injection result of the fuel on the compression stroke. An ignition controlling module 101i outputs the control signal to the ignition plug 25 so that the ignition plug 25 ignites the mixture gas inside the combustion chamber 17 at the set ignition timing.

Here, when the ignition timing setting module 101h predicts that the temperature inside the combustion chamber 17 becomes lower than the target temperature based on the property estimated value, it advances the injection timing on the compression stroke more than the injection timing based on the map so that the ignition timing can be advanced. Moreover, when the ignition timing setting module 101h predicts that the temperature inside the combustion chamber 17 becomes higher than the target temperature based on the property estimated value, it retards the injection timing on the compression stroke more than the injection timing based on the map so that the ignition timing can be retarded.

That is, if the temperature inside the combustion chamber 17 is low, after SI combustion begins by jump-spark ignition, the timing at which the unburnt mixture gas carries out self-ignition (CI combustion start timing $\theta ci$) is delayed, and the SI ratio is deviated from the target SI ratio. In this case, an increase of the unburnt fuel and a degradation of the exhaust emission performance are caused.

Therefore, when it is predicted that the temperature inside the combustion chamber 17 becomes lower than the target temperature, the first injection controlling module 101e and/or the second injection controlling module 101g advance the injection timing, and the ignition timing setting module 101h advances the ignition timing. Since a sufficient heat generation becomes possible by SI combustion, by making the start of SI combustion earlier, it can prevent that the timing θci of self-ignition of unburnt mixture gas is delayed when the temperature inside the combustion chamber 17 is low. As a result, θci approaches the target θci, and the SI ratio approaches the target SI ratio.

Moreover, if the temperature inside the combustion chamber 17 is high, the unburnt mixture gas carries out self-ignition immediately after SI combustion begins by jump-spark ignition, and thereby the SI ratio is deviated from the target SI ratio. In this case, combustion noise increases.

Therefore, when it is predicted that the temperature inside the combustion chamber 17 becomes higher than the target temperature, the first injection controlling module 101e and/or the second injection controlling module 101g retard the injection timing, and the ignition timing setting module 101h retards the ignition timing. Since the start of SI combustion is delayed, it can prevent that the timing θci of self-ignition of unburnt mixture gas becomes early when the temperature inside the combustion chamber 17 is high. As a result, the θci approaches the target θci, and the SI ratio approaches the target SI ratio.

By the ignition plug 25 igniting the mixture gas, SI combustion or SPCCI combustion is carried out inside the combustion chamber 17. The in-cylinder pressure sensor SW6 measures a change in the pressure inside the combustion chamber 17.

The measurement signal of the in-cylinder pressure sensor SW6 is inputted into a θci deviation calculating module 101k. The θci deviation calculating module 101k estimates the CI combustion start timing θci based on the measurement signal of the in-cylinder pressure sensor SW6, and calculates a deviation of the estimated CI combustion start timing θci from the target θci. The θci deviation calculating module 101k outputs the calculated θci deviation to the target in-cylinder property setting module 101b. The target in-cylinder property setting module 101b corrects the model based on the θci deviation. The target in-cylinder property setting module 101b sets the target in-cylinder properties in the subsequent cycles by using the corrected model.

The control logic of this engine 1 adjusts the SI ratio and θci so as to correspond to the operating state of the engine 1 by a property setting device including the throttle valve 43, the EGR valve 54, the air by-pass valve 48, the swirl control valve 56, the intake electric S-VT 23, and the exhaust electric S-VT 24.

Figure 7:
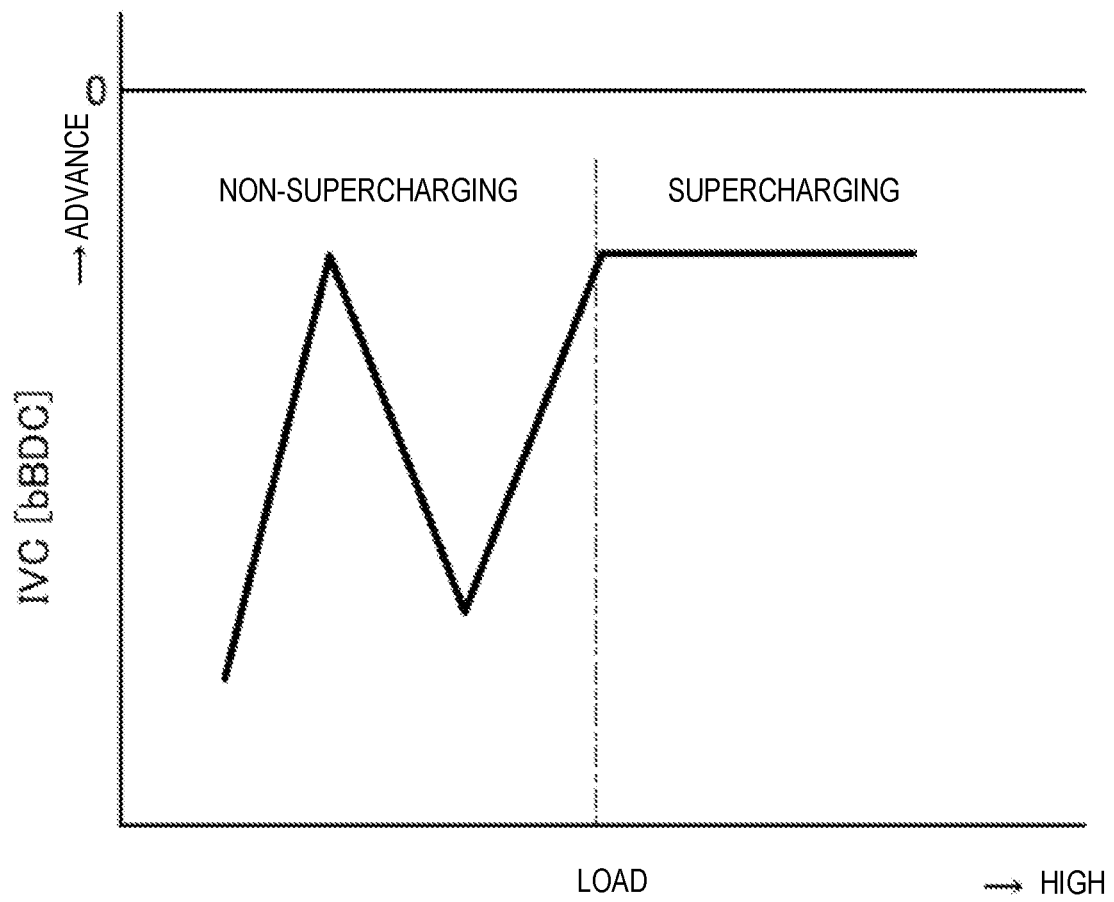
FIG. 7 is a graph illustrating a change in a close timing of an intake valve with respect to an engine load.

As one example of control of the property setting device, FIG. 7 illustrates a change in the close timing IVC of the intake valve 21 with respect to the load of the engine 1. In this figure, the close timing IVC of the intake valve 21 is more advanced as it goes upward. When the close timing IVC of the intake valve 21 is advanced, since the open timing of the intake valve 21 is also advanced, a positive overlap period where both the intake valve 21 and the exhaust valve 22 open becomes longer. Therefore, the amount of EGR gas entering into the combustion chamber 17 increases.

Here, when the engine 1 is in a specific operating state, the engine 1 is operated with an air-fuel ratio (A/F) of mixture gas at a stoichiometric air-fuel ratio or a substantially stoichiometric air-fuel ratio, and a gas-fuel ratio (G/F) leaner than the stoichiometric air-fuel ratio. Therefore, the engine 1 can secure the purification performance of exhaust gas by using the three-way catalyst and improves fuel efficiency. When the load of the engine 1 is low, the amount of fuel supply is small. When the load of the engine 1 is low, the ECU 10 sets the close timing IVC of the intake valve 21 at a timing on the retard side. The amount of air entering into the combustion chamber 17 is limited so as to correspond to the small amount of fuel supply. Moreover, since the amount of EGR gas entering into the combustion chamber 17 is also limited, combustion stability can be secured.

Since the amount of fuel supply increases when the load of the engine 1 becomes higher, combustion stability increases. The ECU 10 sets the close timing IVC of the intake valve 21 at a timing on the advance side. Therefore, the amount of air entering into the combustion chamber 17 increases, and the amount of EGR gas entering into the combustion chamber 17 increases.

When the load of the engine 1 becomes further higher, the temperature inside the combustion chamber 17 becomes further higher. Therefore, the amount of internal EGR gas is reduced and the amount of external EGR gas is increased so that the temperature inside the combustion chamber 17 does not become excessively high. In order to achieve this, the ECU 10 again sets the close timing IVC of the intake valve 21 at a timing on the retard side.

When the load of the engine 1 becomes further higher, the amount of fuel supply increases. In order to introduce the amount of air which makes A/F of mixture gas be the stoichiometric air-fuel ratio or the substantially stoichiometric air-fuel ratio into the combustion chamber 17 with respect to the large amount of fuel supply, the supercharger 44 boosts. When the supercharger 44 starts boosting, the ECU 10 again sets the close timing of the intake valve 21 at a timing on the advance side. Since the amount of air entering into the combustion chamber 17 increases and the positive overlap period where both the intake valve 21 and the exhaust valve 22 open is provided, the residual gas inside the combustion chamber 17 can be purged.

In this way, the control logic of the engine 1 performs a rough adjustment of the SI ratio by adjusting the properties inside the combustion chamber 17. The control logic of the engine 1 is also configured to adjust the SI ratio and θci by adjusting the injection timing and the ignition timing of fuel. By the adjustment of the injection timing and the ignition timing, the difference between the cylinders can be corrected, and a fine adjustment of the self-ignition timing can be performed, for example. By the adjustment of the SI ratio at the two steps, the engine 1 can accurately achieve the desired SPCCI combustion corresponding to the operating state.

(Combustion Noise Control)

Since SPCCI combustion is the combustion form which is a combination of SI combustion and CI combustion, each of knock resulting from SI combustion and knock resulting from CI combustion may occur. Here, if the knock resulting from SI combustion is referred to as the SI knock, and the knock resulting from CI combustion is the CI knock, the SI knock is a phenomenon in which the unburnt gas outside an area where the mixture gas carried out SI combustion inside the combustion chamber 17 rapidly combusts by an abnormal partial self-ignition (a partial self-ignition clearly different from normal CI combustion), and the CI knock is a phenomenon in which the main components of the engine 1 (the cylinder block, the cylinder head, the piston, the crank journal parts, etc.) resonate due to the pressure fluctuation caused by CI combustion. The SI knock appears as loud noise at a frequency of about 6.3 kHz, which is caused by organ-pipe oscillation occurring inside the combustion chamber 17 by the partial self-ignition. On the other hand, the CI knock appears as loud noise at a frequency of about 1 to 4 kHz (more strictly, a plurality of frequencies included in this frequency range), which is caused by the resonance of the primary components of the engine 1. Thus, the SI knock and the CI knock appear as noise at different frequencies resulting from the different factors.

The ECU 10 controls SPCCI combustion so that both the SI knock and the CI knock do not occur. Specifically, the ECU 10 calculates an SI knock index value relevant to the SI knock, and a CI knock index value relevant to the CI knock by carrying out a Fourier transform of the detection signal of the in-cylinder pressure sensor SW6. The SI knock index value is an in-cylinder pressure spectrum near 6.3 kHz which increases with the generation of the SI knock, and the CI knock index value is an in-cylinder pressure spectrum near 1 to 4 kHz which increases with the generation of the CI knock.

Then, the ECU 10 determines a θci limit according to the predefined map so that each of the SI knock index value and the CI knock index value does not exceed an allowable limit, and compares θci determined from the operating state of the engine 1 with the θci limit. If θci limit is the same as or on the advance side of θci, θci is set as the target θci, and on the other hand, if the θci limit is on the retard side of θci, the θci limit is set as the target θci. Both the SI knock and the CI knock are reduced by this control.

(Failure Diagnosis of in-Cylinder Pressure Sensor)

As described above, the engine 1 which performs SPCCI combustion performs the ignition control and the control for reducing combustion noise by using the detection signal of the in-cylinder pressure sensor SW6. In the engine 1, the detection signal of the in-cylinder pressure sensor SW6 is important. If a misdetection signal is outputted by a failure of the in-cylinder pressure sensor SW6, trouble may be caused in the operational control of the engine 1. Therefore, the engine 1 is provided with the failure diagnosis device 100 for the in-cylinder pressure sensor SW6.

Figure 8:
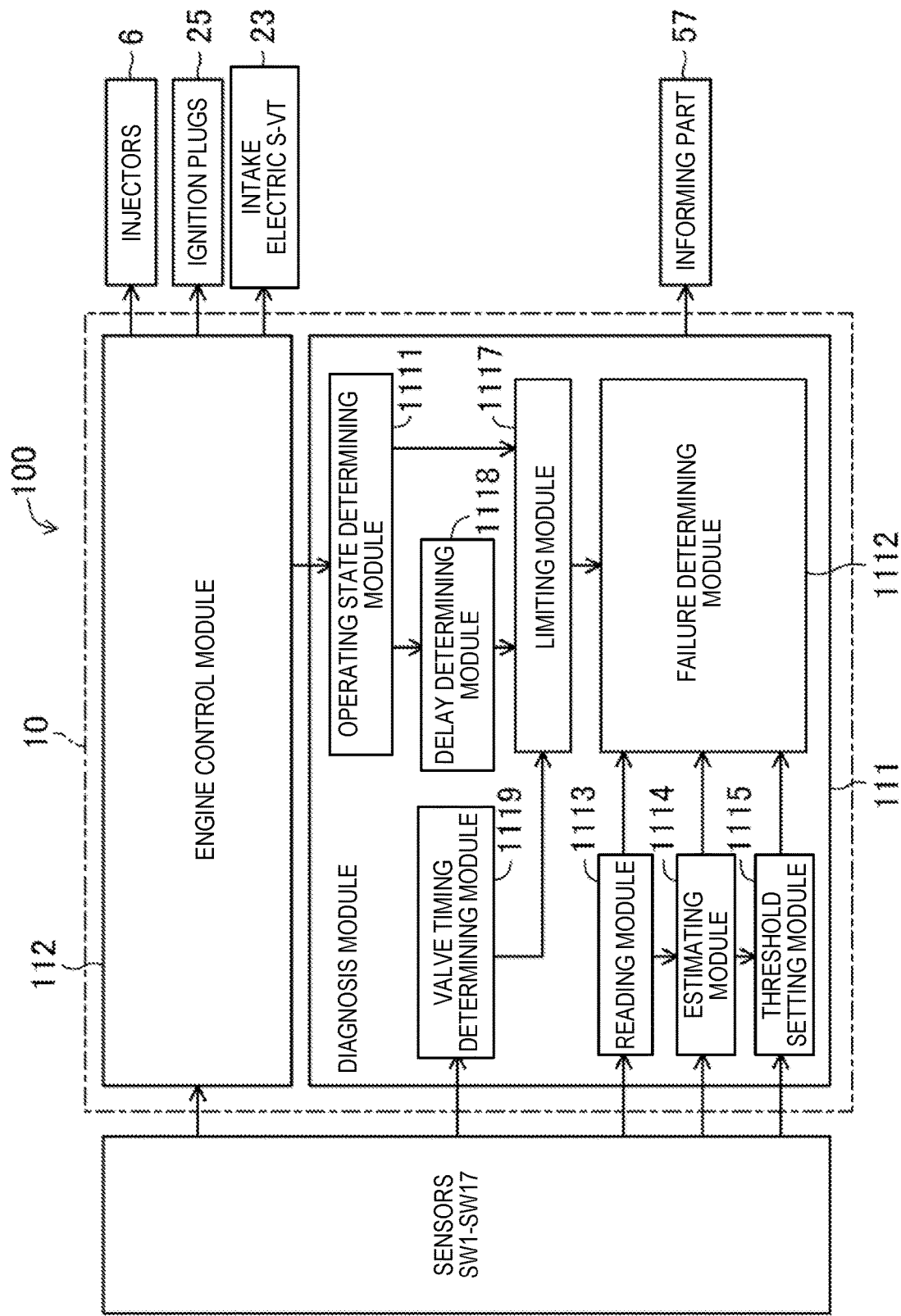
FIG. 8 is a block diagram illustrating a functional configuration according to a failure diagnosis device for the in-cylinder pressure sensor.

FIG. 8 illustrates a configuration of the failure diagnosis device 100 for the in-cylinder pressure sensor SW6. The failure diagnosis device 100 includes a diagnosis module 111 and an engine control module 112. The diagnosis module 111 and the engine control module 112 are functional blocks constituted by the ECU 10. The engine control module 112 controls the operation of the engine 1. Here, the engine control module 112 performs a fuel cut control of the engine 1. Specifically, the engine control module 112 stops the supply of the fuel to the engine 1 through the injector 6, when a slowdown fuel cut condition is satisfied, during the travel of the automobile. The engine control module 112 determines that the slowdown fuel cut condition is satisfied based on the detection signal of the accelerator opening sensor SW12.

When the fuel supply stops, the engine 1 carries out the fuel-cut operation. The ignition plug 25 does not perform any ignition during the fuel-cut operation. The intake electric S-VT 23 changes the valve timing of the intake valve 21 to a preset target valve timing. The target valve timing is a valve timing suitable for a resume from the fuel-cut operation. The engine control module 112 changes the valve timing of the intake valve 21 to the target valve timing through the intake electric S-VT 23, after stopping the fuel supply to the engine 1.

The diagnosis module 111 diagnoses the failure of the in-cylinder pressure sensor SW6 when a given condition is satisfied.

In detail, the diagnosis module 111 diagnoses the failure of the in-cylinder pressure sensor SW6, while the engine 1 continues a steady operation for a given period of time. While the engine 1 continues the steady operation, variations of the combustion pressure of the mixture gas, the temperature of the wall surface of the combustion chamber, the ratio of specific heat of the mixture gas, etc. become smaller, as compared with a period while the engine 1 performs a transitional operation, for example. If the failure diagnosis of the in-cylinder pressure sensor SW6 is performed when the environment inside the cylinder is stable, the variation in the output of the in-cylinder pressure sensor SW6 unrelated to the failure can be reduced.

Moreover, the diagnosis module 111 diagnoses the failure of the in-cylinder pressure sensor SW6, also while the engine 1 carries out the fuel cut operation, in addition to while the engine 1 continues the steady operation. Accordingly, the diagnosis module 111 can diagnose the failure of the in-cylinder pressure sensor SW6 based on the pressure variation inside the combustion chamber 17 which is not influenced by the combustion of the mixture gas. Moreover, since the ignition plug 25 does not ignite the fuel while the engine 1 carries out the fuel cut operation, it is also advantageous that the detection signal of the in-cylinder pressure sensor SW6 is not influenced by noise of the ignition plug 25.

—Primary Configuration of Functional Blocks—

The diagnosis module 111 includes, as its primary components, an operating state determining module 1111 which determines the steady operation, the fuel cut operation, etc., an estimating module 1114 which estimates the in-cylinder pressure at a post-top timing (+α° CA) which is a timing retarded by a specific crank angle from a compression top dead center, a reading module 1113 which reads the detection signal of the in-cylinder pressure sensor SW6 at the post-top timing, and a failure determining module 1112 which determines the failure of the in-cylinder pressure sensor SW6 in response to signals outputted from the estimating module 1114 and the reading module 1113.

The operating state determining module 1111 determines that the engine 1 continues the steady operation for the given period of time. Here, the operating state determining module 1111 determines that the engine 1 carries out the steady operation, when the operating state of the engine 1 is maintained constant or substantially constant. In detail, the operating state determining module 1111 determines that the engine 1 carries out the steady operation when at least one of an amount of air filled up in the combustion chamber 17, an amount of EGR gas contained in the mixture gas inside the combustion chamber 17, and an amount of fuel supplied to the combustion chamber 17, fall within a given range.

In more detail, the operating state determining module 1111 determines the amount of air filled up in the combustion chamber 17, the amount of EGR gas contained in the mixture gas inside the combustion chamber 17, and the amount of fuel supplied to the combustion chamber 17 based on the detection signals of the sensors SW1-SW17. The operating state determining module 1111 determines that the engine 1 carries out the steady operation when the amount of change in each of the three amounts is determined to be below a given value.

Then, the operating state determining module 1111 determines that "the engine 1 continues the steady operation for the given period of time," when the engine 1 continues the steady operation for a set period of time (in this example, several seconds).

Moreover, the operating state determining module 1111 determines that "the engine 1 starts the fuel cut operation," when it is determined that the slowdown fuel cut condition of the engine controller 112 is satisfied.

The estimating module 1114 estimates the in-cylinder pressure at the post-top timing based on the operating state of the engine 1, when the operating state determining module 1111 determines the continuation of the steady operation, or when the operating state determining module 1111 determines the fuel cut operation. Below, the value of the in-cylinder pressure estimated by the estimating module 1114 is referred to as the "post-top estimated value." The post-top estimated value indicates an estimated value of the in-cylinder pressure expected to be reached if the in-cylinder pressure sensor SW6 has not failed.

The post-top estimated value estimated by the estimating module 1114 is inputted into the failure determining module 1112. The post-top timing is illustration of a "first timing."

The reading module 1113 reads a value of the detection signal of the in-cylinder pressure sensor SW6 at the post-top timing (i.e., a post-top signal value), and a value of the detection signal of the in-cylinder pressure sensor SW6 at the pre-top timing ($-\alpha°$ CA) advanced by the same specific crank angle as the post-top timing from the compression top dead center (i.e., a pre-top signal value). The pre-top timing is illustration of a "second timing."

Note that the specific crank angle is set so that the post-top timing becomes within the first half of an expansion stroke. Here, the "first half" may also be an early stage, for example, when the expansion stroke is divided into three stages of the early stage, a middle stage, and a later stage. The specific crank angle may be, for example, near 60° C.A. The influence of the cooling loss can be reduced by setting so that the post-top timing becomes the first half of the expansion stroke. Therefore, the accuracy of the failure diagnosis can be improved.

Moreover, according to the operating state of the engine 1, the specific crank angle may be set on real time. In that case, the specific crank angle is set after the valve close of the intake valve 21 is completed, not during the transition of the valve close of the intake valve 21 by the intake electric S-VT 23. Further, in each cycle, the specific crank angle may be set to be before the ignition timing. By setting in this way, the influence of the close operation of the intake valve 21 and the influence of the combustion of the mixture gas can be reduced. Therefore, the accuracy of the failure diagnosis can be improved.

That is, in order to improve the accuracy of the failure diagnosis of the in-cylinder pressure sensor SW6, it is desirable to set the specific crank angle so that the pre-top timing becomes before the ignition timing and the post-top timing becomes in the first half of the expansion stroke, and performs such setting after the close timing IVC of the intake valve 21.

The pre-top signal value read by the reading module 1113 is inputted into the estimating module 1114. The estimating module 1114 estimates the post-top estimated value based on the inputted pre-top signal value. On the other hand, the post-top signal value read by the reading module 1113 is inputted into the failure determining module 1112.

The failure determining module 1112 determines the failure of the in-cylinder pressure sensor SW6 based on the output fall of the detection signal of the in-cylinder pressure sensor SW6. As will be described later, the output fall of the detection signal of the in-cylinder pressure sensor SW6 originates an abnormality of electrical insulation of the insulated part 712 of the in-cylinder pressure sensor SW6. The failure determining module 1112 determines that the in-cylinder pressure sensor SW6 is failed based on a comparison of the post-top estimated value estimated by the estimating module 1114 with the post-top signal value read by the reading module 1113. This comparison is indirectly performed through the threshold based on the post-top estimated value and the difference based on the post-top signal value.

In more detail, the failure determining module 1112 determines that the in-cylinder pressure sensor SW6 is failed, when the difference between the post-top signal value and the pre-top signal value exceeds the threshold defined corresponding to the post-top estimated value.

The diagnosis module 111 is further provided with a threshold setting module 1115. The threshold setting module 1115 sets the threshold based on the post-top estimated value. The failure determining module 1112 reads the threshold set by the threshold setting module 1115.

If the failure determining module 1112 determines the failure of the in-cylinder pressure sensor SW6, it informs of the failure through the informing device 57. Therefore, the user is informed that the in-cylinder pressure sensor SW6 has failed.

—Functional Blocks Relevant to Limitation of Failure Determination—

Further, as functional blocks relevant to limitation of the failure determination, the diagnosis module 111 includes a limiting module 1117 which limits the determination of the failure by the failure determining module 1112, and a delay determining module 1118 and a valve timing determining module 1119 which output signals to the limiting module 1117.

While the engine 1 continues the steady operation, or while the engine 1 performs the fuel cut operation, the limiting module 1117 limits the failure diagnosis of the in-cylinder pressure sensor SW6 until the valve timing of the intake valve 21 becomes the target valve timing. The in-cylinder pressure sensor SW6 outputs the signal corresponding to the pressure variation resulting from a volume change of the combustion chamber 17, etc. The failure determining module 1112 performs the failure determination based on the detection signal of the in-cylinder pressure sensor SW6 corresponding to such a pressure variation. Since the timing at which the compression of the gas inside the combustion chamber 17 is started changes when the close timing of the intake valve 21 is changed, the pressure and the maximum pressure inside the combustion chamber 17 during a compression stroke also change. As a result, even if the in-cylinder pressure sensor SW6 has not failed, the output of the in-cylinder pressure sensor SW6 varies, and therefore, the accuracy of the failure diagnosis of the in-cylinder pressure sensor SW6 is deteriorated. By limiting the failure diagnosis of the in-cylinder pressure sensor SW6 until the close timing of the intake valve 21 becomes the target timing, the failure determining module 1112 can perform the failure determination of the in-cylinder pressure sensor SW6 when the close timing of the intake valve 21 is a specific timing. Therefore, the accuracy of the failure diagnosis of the in-cylinder pressure sensor SW6 can be improved.

A detection signal of the intake cam angle sensor SW13 is inputted into the valve timing determining module 1119. The valve timing determining module 1119 outputs a signal to the limiting module 1117, when it determines that the valve timing of the intake valve 21 becomes the target valve timing based on the detection signal of the intake cam angle sensor SW13.

While performing the fuel cut operation, the limiting module 1117 limits that the failure determining module 1112 determines the failure of the in-cylinder pressure sensor SW6 for a set period of time after the supply of the fuel to the engine 1 is stopped. Immediately after stopping the fuel supply to the engine 1, the environment inside the combustion chamber 17 is not stable. For example, immediately after stopping the fuel supply to the engine 1, a ratio of specific heat of the gas inside the combustion chamber 17 may not become constant because the EGR gas which remains inside the EGR passage 52 enters into the combustion chamber 17. Moreover, a change in the temperature of the wall surface inside the combustion chamber 17 is sometimes large immediately after stopping the fuel supply to the engine 1. As a result, even if the in-cylinder pressure sensor SW6 does not fail, the output of the in-cylinder pressure sensor SW6 varies, and the accuracy of the diagnosis of failure of the in-cylinder pressure sensor SW6 is deteriorated.

Therefore, the limiting module 1117 limits that the failure determining module 1112 determines the failure of the in-cylinder pressure sensor SW6 for the preset period after stopping the fuel supply to the engine 1. Accordingly, the diagnosis module 111 can more accurately diagnose the failure of the in-cylinder pressure sensor SW6 during the fuel-cut operation.

The diagnosis module 111 is provided with a delay determining module 1118. The delay determining module 1118 counts the number of cycles of the engine 1. The delay determining module 1118 is a timer for measuring that the preset period described above has lapsed. The delay determining module 1118 starts the count of the number of cycles when a signal indicating that the engine 1 performs the fuel-cut operation is received from the operating state determining module 1111. If the delay determining module 1118 determines that a preset number of cycles has lapsed after stopping the supply of the fuel to the engine 1, it outputs a signal to the limiting module 1117. Note that the delay determining module 1118 may measure a period of time after stopping the fuel supply to the engine 1, instead of counting the number of cycles.

(Specific Configuration Relevant to Failure Diagnosis)

Figure 9:
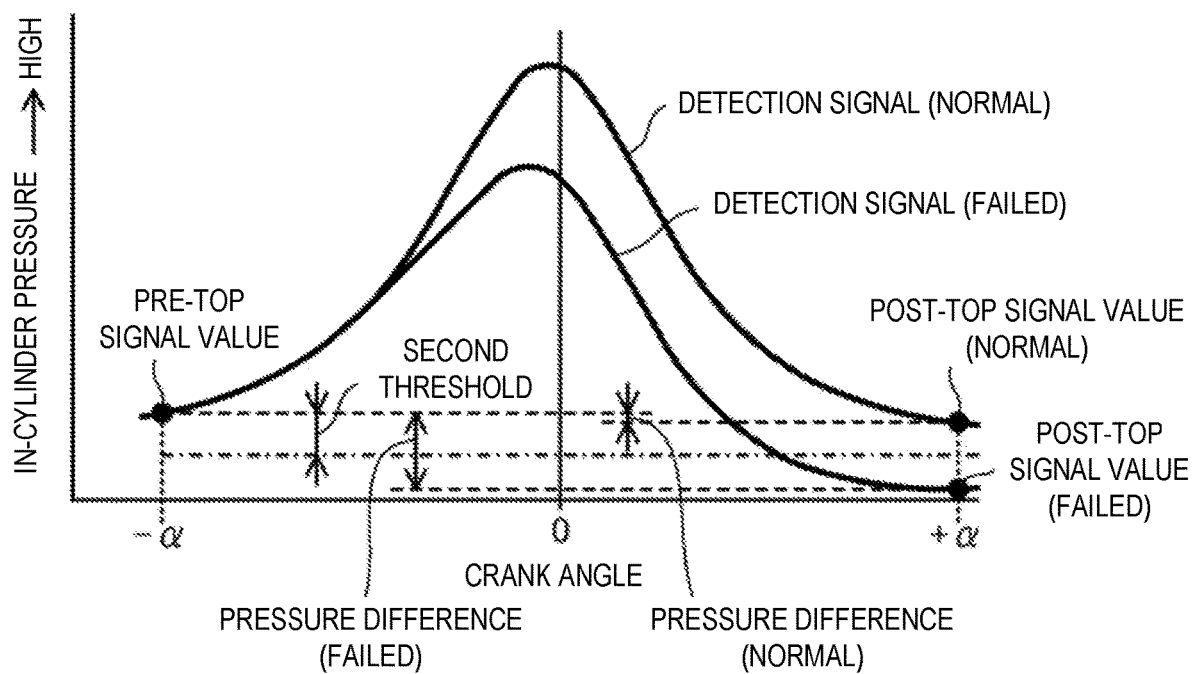
FIG. 9 is a graph illustrating a waveform of a signal which is outputted from the in-cylinder pressure sensor when the in-cylinder pressure sensor is normal, and a waveform of the signal outputted when the sensor has failed.

FIG. 9 illustrates one example of the detection signal outputted when the in-cylinder pressure sensor SW6 is normal, and the detection signal outputted when the in-cylinder pressure sensor SW6 has failed. In FIG. 9, the horizontal axis is a crank angle, where 0 represents a compression top dead center. In FIG. 9, the vertical axis is the pressure inside the combustion chamber 17 (in-cylinder pressure), which is proportional to the detection signal of the in-cylinder pressure sensor SW6.

As illustrated in FIG. 9, if the in-cylinder pressure sensor SW6 is normal, the in-cylinder pressure becomes the maximum near the compression top dead center, and becomes substantially symmetrical centering on the crank angle at which the pressure becomes the maximum. When the in-cylinder pressure sensor SW6 has not failed (when the sensor is normal), the post-top signal value slightly falls below the pre-top signal value by the influence of the cooling loss, etc.

Figure 10:
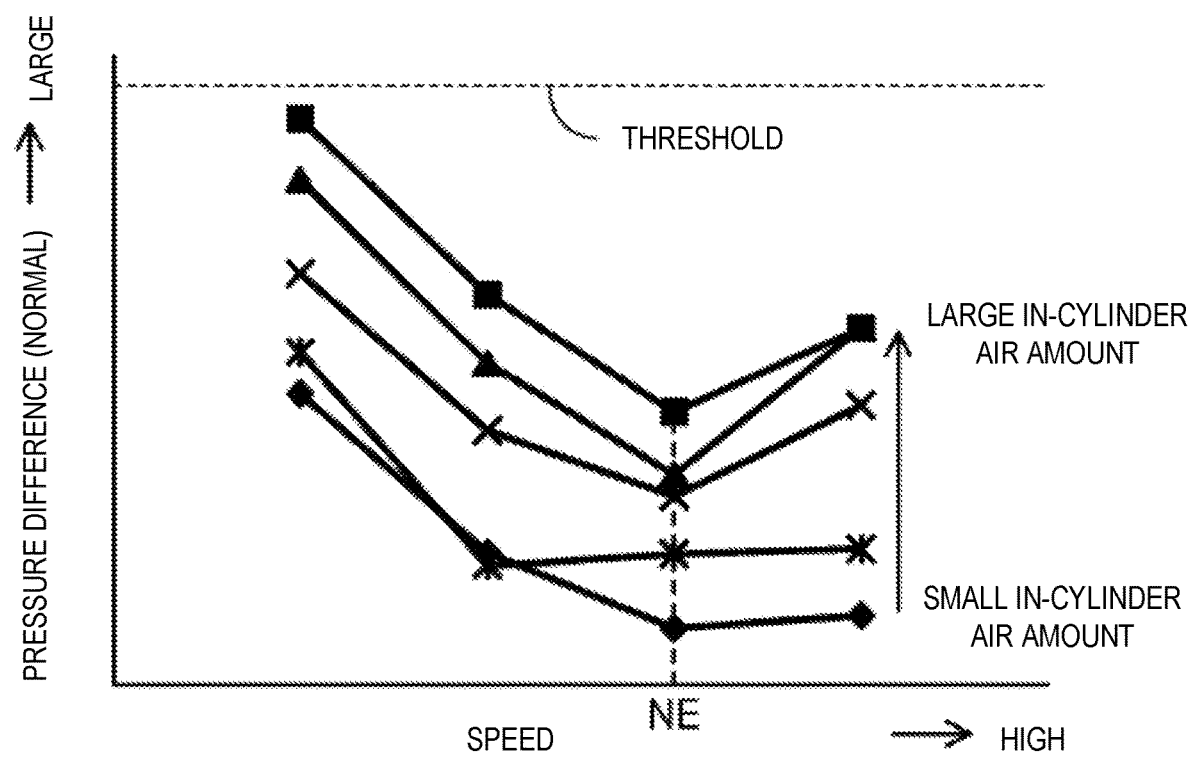
FIG. 10 is a graph illustrating a pressure difference when the in-cylinder pressure sensor is normal, and a threshold according to the failure diagnosis of the in-cylinder pressure sensor.

FIG. 10 illustrates the pressure difference when the sensor is normal. The pressure difference illustrated in FIG. 10 indicates a difference obtained by subtracting the post-top signal value when the sensor is normal (post-top estimated value) from the pre-top signal value.

As illustrated in FIG. 10, since the cooling loss per unit time decreases as the engine speed increases, the in-cylinder pressure after the compression top dead center becomes higher, in general. Therefore, the pressure difference when the sensor is normal becomes smaller, in general.

Moreover, as illustrated in FIG. 10, when the amount of air filled up into the combustion chamber 17 (in-cylinder air amount) is large, a leak of air during the compression stroke increases, and therefore, the in-cylinder pressure after the compression top dead center falls in general. Therefore, the pressure difference when the sensor is normal becomes smaller, in general.

The tendency illustrated in FIG. 10 is a tendency when the in-cylinder pressure sensor SW6 operates normally. On the other hand, the present inventors obtained new knowledge about the tendency when the in-cylinder pressure sensor SW6 has failed, as a result of diligent examinations.

Specifically, it is newly found out that the post-top signal value fluctuates greatly as compared with the pre-top signal value, when the in-cylinder pressure sensor SW6 is failed under the influence of heat etc. Therefore, if the in-cylinder pressure sensor SW6 is failed, the post-top signal value which is actually detected relatively deviates largely from the estimated post-top estimated value which is expected to be reached if the sensor is normal. According to the examination of the present inventors, it is found out that the post-top signal value falls when the insulation abnormality occurs in the insulated part 712. In this case, as a result of the symmetry of the signal value of the in-cylinder pressure sensor SW6 collapsing, the difference between the pre-top signal value and the post-top estimated value, and the post-top signal value becomes larger.

Therefore, as described above, the diagnosis module 111 determines that the in-cylinder pressure sensor SW6 has failed based on the comparison of the post-top estimated value estimated beforehand with the post-top signal value read by the reading module 1113.

While the engine 1 continues the steady operation, the variation in the output unrelated to the failure of the in-cylinder pressure sensor SW6 can be reduced. Therefore, while the variation in the output unrelated to the failure can be reduced, it becomes possible to diagnose at the timing where the output fluctuates notably when the failure occurs. Therefore, the failure relevant to the insulated part 712 can be diagnosed more accurately.

The estimating module 1114 estimates the post-top estimated value as described above. The estimating module 1114 estimates the post-top estimated value based on the pre-top signal value. A map corresponding to the pressure difference illustrated in FIG. 10 is stored in the memory 102 of the ECU 10. The estimating module 1114 estimates the post-top estimated value by reading the pressure difference based on the operating state of the engine 1, based on the map, and subtracting the pressure difference from the pre-top signal value.

The post-top estimated value is in agreement with the post-top signal value when the in-cylinder pressure sensor SW6 operates normally, as clear from this estimating technique. Therefore, the difference between the post-top estimated value and the pre-top signal value indicates the tendency illustrated in FIG. 10.

That is, the estimating module 1114 estimates the post-top estimated value higher in general as the engine speed increases. This means that the influence of the cooling loss is taken into consideration. The influence of the cooling loss may become a factor of the error when estimating the in-cylinder pressure, although it is unrelated to the failure of the in-cylinder pressure sensor SW6. In order to perform the failure diagnosis more accurately, it is effective to take the influence of the cooling loss into consideration.

Moreover, the estimating module 1114 estimates the post-top estimated value lower in general as the amount of air filled up into the combustion chamber 17 increases. This means that the leak from the fitting parts of the piston rings is taken into consideration. This phenomenon can be a factor of the error when estimating the in-cylinder pressure, although it is unrelated to the failure of the in-cylinder pressure sensor SW6. In order to perform the failure diagnosis more accurately, it is effective to take the leak from the fitting parts into consideration.

Moreover, as a tendency peculiar to the time when the mixture gas combusts inside the combustion chamber 17 (while the engine 1 continues the steady operation), the estimating module 1114 estimates the pressure inside the combustion chamber 17 larger as the load of the engine 1 increases.

The combustion pressure becomes higher as the load of the engine 1 increases. The present inventors confirmed that, when the combustion pressure is high, the mating between the diaphragm 71 and the piezo-electric element 75 becomes stronger, and as a result, the signal value of the in-cylinder pressure sensor SW6 appears to be smaller. This phenomenon reduces the post-top signal value greatly as compared with the pre-top signal value. Such a tendency can be a factor of the error when estimating the in-cylinder pressure, although it is unrelated to the failure of the in-cylinder pressure sensor SW6. In order to perform the failure diagnosis more accurately, it is effective to take the influence of the mating into consideration.

Specifically, the estimating module 1114 estimates the post-top estimated value lower as the load of the engine 1 increases. This becomes advantageous when diagnosing the failure of the in-cylinder pressure sensor SW6 more accurately.

Figure 11:
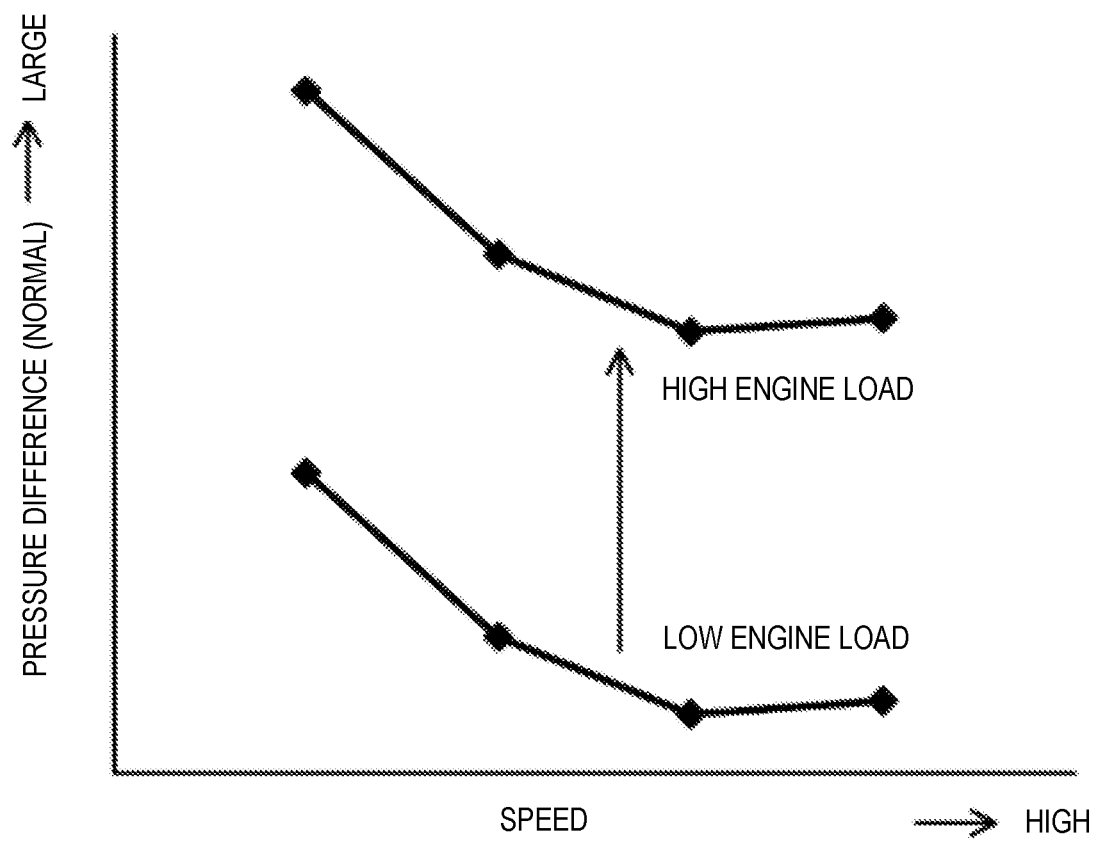
FIG. 11 is a graph illustrating the pressure difference according to an engine load.

For example, when the air/fuel ratio is constant, the load of the engine 1 becomes higher as the amount of air filled up into the combustion chamber 17 increases. Therefore, the pressure difference used for the estimation of the post-top estimated value indicates the same tendency as or a similar tendency to the in-cylinder air amount, as illustrated in FIG. 11.

Figure 12:
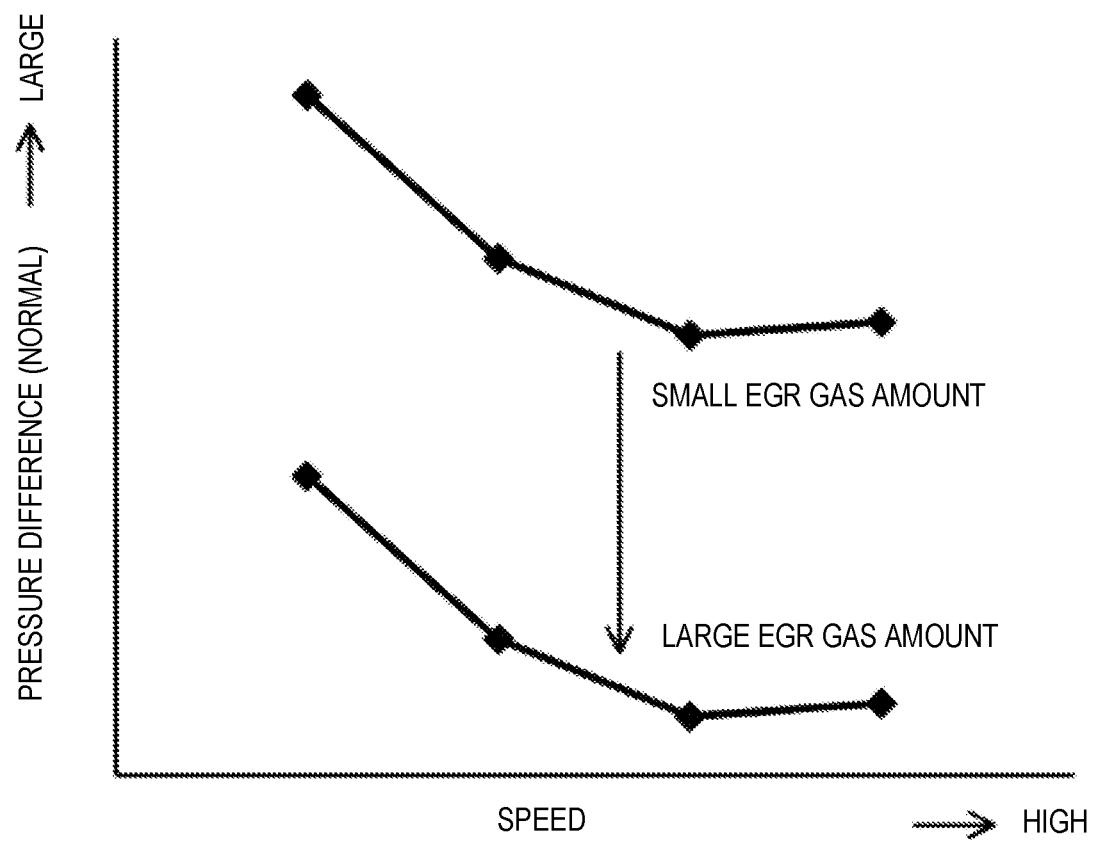
FIG. 12 is a graph illustrating the pressure difference according to an EGR gas amount.

Moreover, for example, the ratio of specific heat of the mixture gas, and therefore, the combustion temperature become lower as the amount of EGR gas increases. In this case, it can be considered that the influence of the combustion to the in-cylinder pressure sensor SW6 becomes relatively smaller and the pressure difference when the sensor is normal becomes smaller (see FIG. 12). Such a tendency can be a factor of the error when estimating the in-cylinder pressure, although it is unrelated to the failure of the in-cylinder pressure sensor SW6. Therefore, in order to improve the accuracy of the failure diagnosis, it is effective to take the amount of EGR gas into consideration.

Specifically, the estimating module 1114 estimates the post-top estimated value higher as the amount of EGR gas contained in the mixture gas increases. This becomes advantageous when diagnosing the failure of the in-cylinder pressure sensor SW6 more accurately.

The diagnosis module 111 sets the threshold corresponding to the post-top estimated value. Specifically, the threshold setting module 1115 sets the threshold so as to be larger than a difference obtained by subtracting the post-top estimated value from the pre-top signal value (i.e., the pressure difference when the sensor is normal). The threshold is set larger as the post-top estimated value becomes smaller.

When such a configuration is adopted, the diagnosis module 111 sets the threshold smaller, for example, as the engine speed increases. Similarly, the diagnosis module 111 sets the threshold larger, for example, as the amount of air filled up in the combustion chamber 17 increases. Accordingly, it becomes possible to set the threshold larger than the pressure difference resulting from the cooling loss, or set the threshold larger than the difference resulting from the leak loss. Therefore, the accuracy of the failure diagnosis can be improved.

The failure determining module 1112 indirectly compares the post-top estimated value with the post-top signal value. In detail, the failure determining module 1112 compares the threshold defined according to the post-top estimated value with the difference between the pre-top signal value and the post-top signal value, and when the compared difference exceeds the threshold, it determines that the in-cylinder pressure sensor SW6 has failed. Therefore, the failure diagnosis of the in-cylinder pressure sensor SW6 can be performed more accurately.

Note that the failure determining module 1112 may repeatedly perform the comparison of the difference between the pre-top signal value and the post-top signal value with the threshold, and when the determination that the difference compared in this way exceeds the threshold is made continuously a plurality of times, it may determine that the in-cylinder pressure sensor SW6 has failed.

For example, as a result of the mating of the parts which constitute the in-cylinder pressure sensor SW6 being changed during a compression stroke, the pressure inside the combustion chamber 17 may fall after a compression top dead center. Although such a pressure fall is only a temporary phenomenon, there is a possibility of causing a false diagnosis of the in-cylinder pressure sensor SW6.

On the other hand, since the pressure inside the combustion chamber 17 falls continuously when the in-cylinder pressure sensor SW6 has actually failed, it becomes advantageous for performing the failure diagnosis of the in-cylinder pressure sensor SW6 more accurately if the determination by the failure determining module 1112 is repeatedly performed as described above.

(Procedure of Failure Diagnosis of in-Cylinder Pressure Sensor)

Figure 13A:
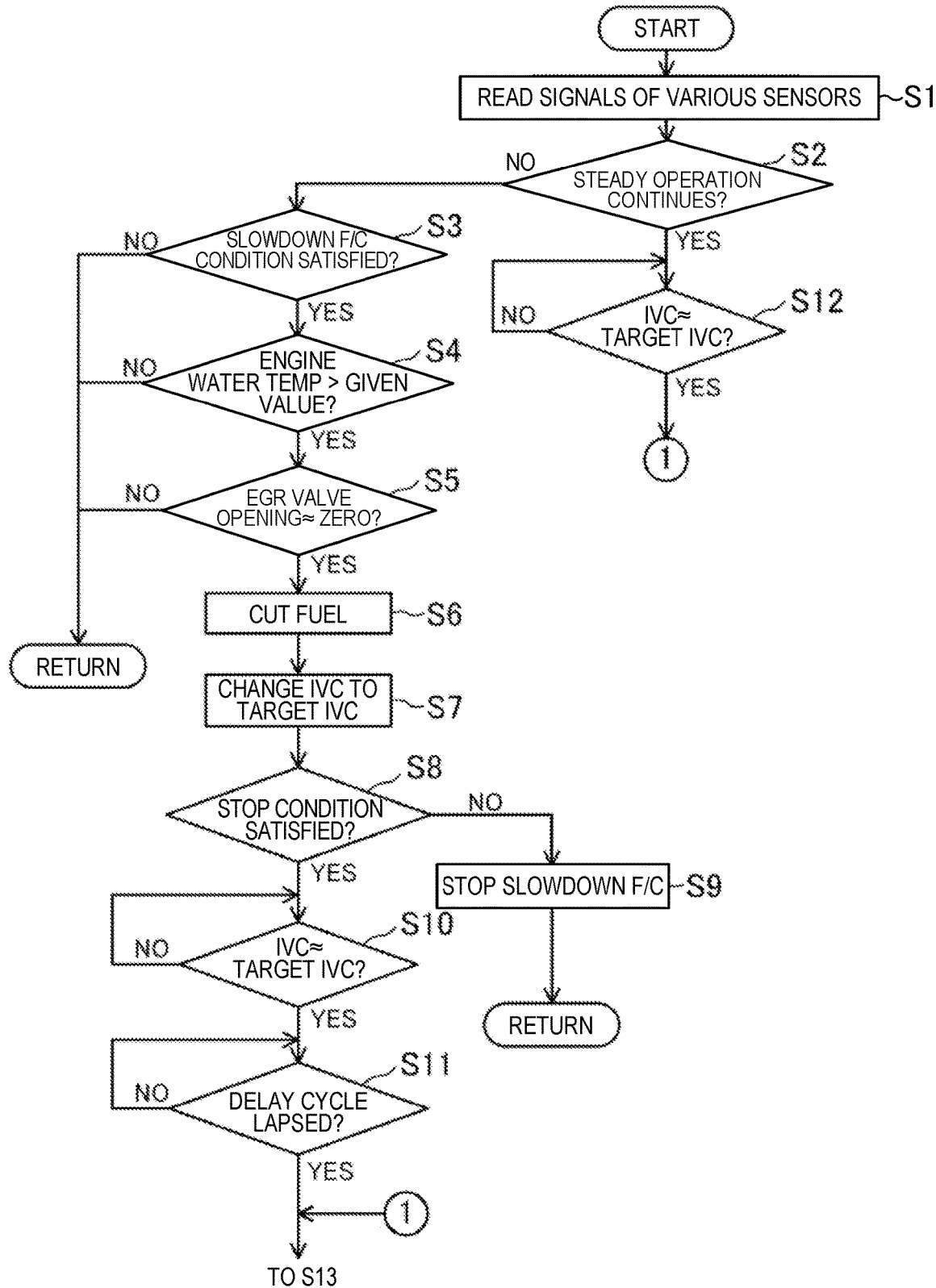
FIGS. 13A and 13B illustrate a flowchart of procedure of the failure diagnosis of the in-cylinder pressure sensor.
Figure 13B:
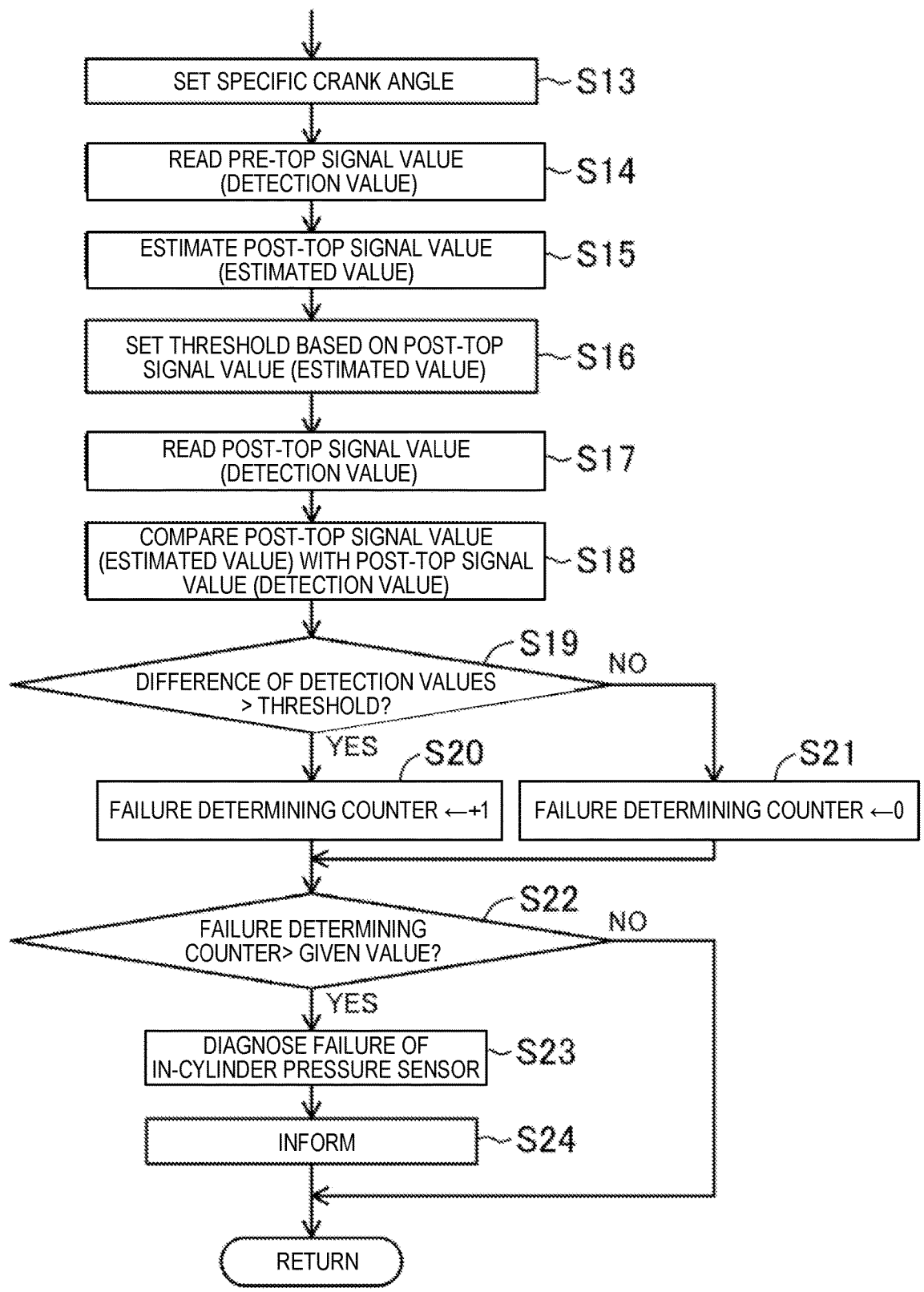

FIGS. 13A and 13B illustrate a flowchart of a procedure of the failure diagnosis of the in-cylinder pressure sensor SW6, which is executed by the failure diagnosis device 100. At Step S1 after a start of the procedure, the failure diagnosis device 100 reads the detection signals from the sensors SW1-SW17.

In the subsequent Step S2, the operating state determining module 1111 determines whether the engine 1 continues the steady operation for the given period of time based on the detection signals of the sensors SW1-SW17. Specifically, the operating state determining module 1111 determines that the engine 1 carries out the steady operation when an amount of change in each of the amount of air filled up in the combustion chamber 17, the amount of EGR gas contained in the mixture gas inside the combustion chamber 17, and the amount of fuel supplied to the combustion chamber 17 is determined to be below a given value. For example, the amount of fuel supplied to the combustion chamber 17 may be determined through the detection signal of the accelerator opening sensor SW12.

If it is determined that the steady operation continues at Step S2, the process shifts to Step S12. If it is determined that the steady operation does not continue, the process shifts to Step S3. In the former case, a determination according to the close timing of the intake valve 21 (Step S12) is performed, and the process then shifts to processing which performs the failure diagnosis of the in-cylinder pressure sensor SW6 (Steps S13-S24). In the latter case, via a determination of whether to perform the fuel cut operation (Steps S3-S9), processing according to the limitation of the failure diagnosis is performed (Steps S10-S11), and the process then shifts to the processing to perform the failure diagnosis (Steps S13-S24).

Specifically, at Step S12, the valve timing determining module 1119 of the diagnosis module 111 determines whether the close timing of the intake valve 21 becomes the target timing or substantially the target timing. While the determination at Step S12 is NO, the process repeats Step S12. While the process repeats Step S12, the limiting module 1117 limits the execution of the failure diagnosis by the failure determining module 1112. If the determination at Step S12 becomes YES, the process shifts to Step S13.

On the other hand, at Step S3, the operating state determining module 1111 determines whether the slowdown fuel cut condition is satisfied. Specifically, the operating state determining module 1111 determines whether the accelerator opening becomes zero based on the detection signal of the accelerator opening sensor SW12. If the accelerator opening becomes zero and the slowdown fuel cut condition is satisfied, the process shifts to Step S4. If the slowdown fuel cut condition is not satisfied, the process returns.

At Step S4, the operating state determining module 1111 determines whether the engine water temperature exceeds a given value based on the detection signal of the water temperature sensor SW10. If the engine water temperature exceeds the given value, the fuel cut is executed. If the engine water temperature does not exceed the given value, the fuel cut is not executed. If the determination at Step S4 is YES, the process shifts to Step S5. If the determination at Step S4 is NO, the process returns.

At Step S5, the operating state determining module 1111 determines whether the opening of the EGR valve 54 becomes zero or substantially zero. The EGR valve 54 is closed during the fuel cut. If the determination at Step S5 is YES, the process shifts to Step S6, and on the other hand, if the determination at Step S5 is NO, the process returns.

At Step S6, the engine control module 112 stops the supply of the fuel to the engine 1 through the injector 6 (i.e., the fuel cut). At the subsequent Step S7, the engine control module 112 changes the valve timing of the intake valve 21 through the intake electric S-VT 23 to a target valve timing set during the fuel-cut operation.

At Step S8, the operating state determining module 1111 determines whether a stop condition of the slowdown fuel cut is satisfied. For example, the engine control module 112 stops the fuel cut when the engine speed falls excessively. Moreover, the fuel cut is stopped when the accelerator opening exceeds zero. If the determination at Step S8 is YES, the process shifts to Step S9 where the engine control module 112 stops the slowdown fuel cut. If the determination at Step S8 is NO, the process shifts to Step S10.

At Step S10, the valve timing determining module 1119 of the diagnosis module 111 determines whether the close timing of the intake valve 21 becomes a target timing, or substantially the target timing. While the determination is NO at Step S10, the process repeats Step S10. The limiting module 1117 limits the execution of the failure diagnosis by the failure determining module 1112 during the repetition of Step 10. If the determination at Step S10 becomes YES, the process shifts to Step S11.

Figure 14:
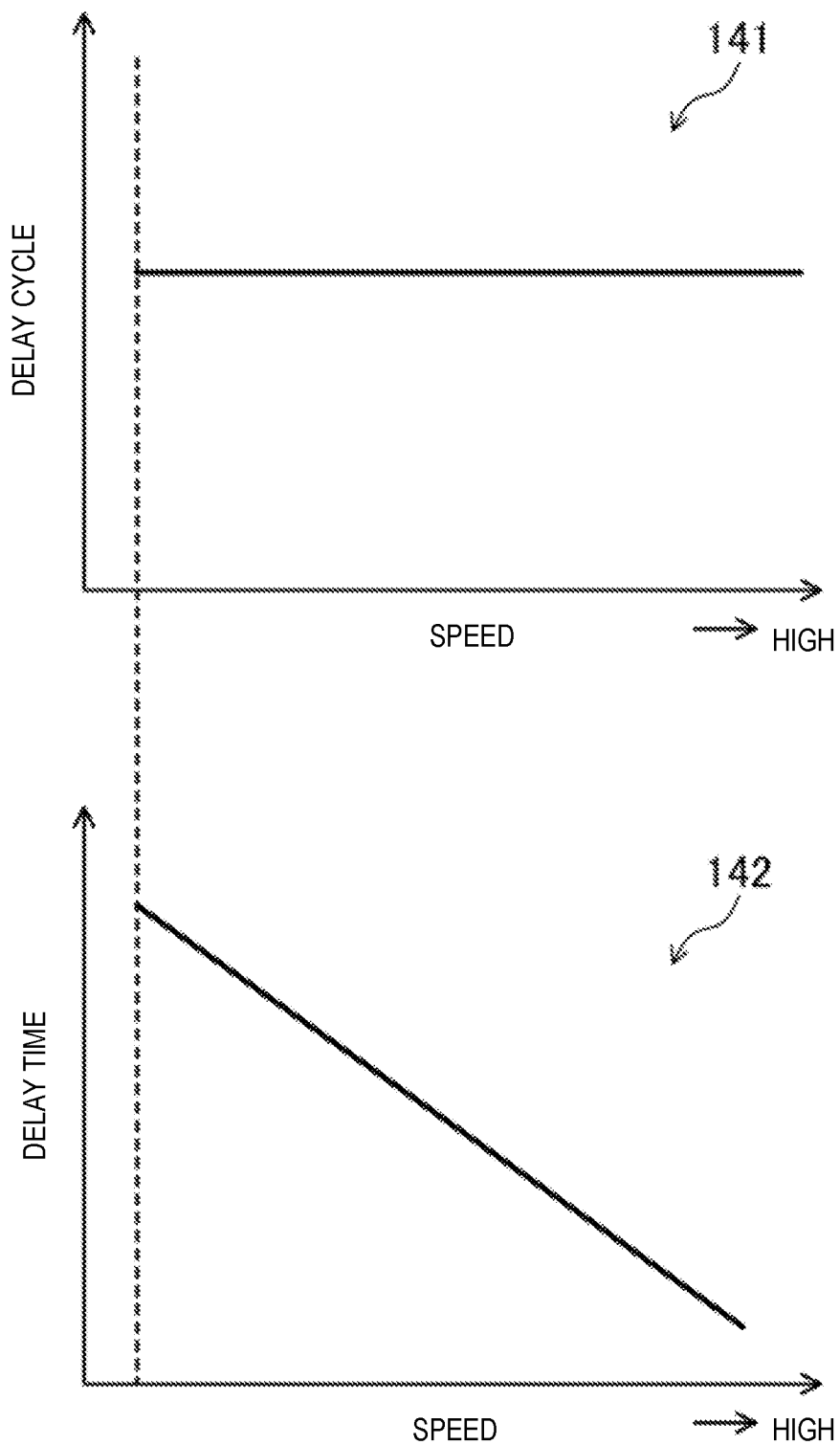
FIG. 14 illustrates a relation between an engine speed and a delay, where the upper graph illustrates a relation between the engine speed and a delay cycle, and the lower graph illustrates a relation between the engine speed and a delay time.

At Step S11, the delay determining module 1118 of the diagnosis module 111 determines whether a delay cycle has lapsed after the fuel cut is started. Here, an upper chart 141 of FIG. 14 illustrates a relation between the engine speed and the delay cycle. The delay cycle is constant regardless of the engine speed. By passing a given number of cycles, a gas exchange can be performed for each combustion chamber 17 at least one time, and therefore, the environment in each combustion chamber 17 is stabilized.

Note that as described above, the delay determining module 1118 may measure time instead of counting of the number of cycles of the engine 1. A lower chart 142 of FIG. 14 illustrates a relation between the engine speed and a delay time. The delay time is shorter as the engine speed increases. That is because the time required for one cycle becomes shorter as the engine speed increases.

Returning to the flowchart of FIG. 13A, if the determination at Step S11 is NO, the process repeats Step S11. The limiting module 1117 limits the execution of the failure diagnosis by the failure determining module 1112. If the determination at Step S10 becomes YES, the process shifts to Step S13.

The limiting module 1117 limits the failure diagnosis of the in-cylinder pressure sensor SW6 until two conditions are satisfied. The two conditions include the close timing of the intake valve 21 becoming the target timing, and the delay cycle (or the delay time) being lapsed after the fuel cut is started. Accordingly, since the failure determining module 1112 can perform the failure diagnosis of the in-cylinder pressure sensor SW6 when the inside of the combustion chamber 17 is in the same state, it can improve the accuracy of the failure diagnosis.

The process at and after Step S13 illustrated in the flowchart of FIG. 13B is common to the case where the engine 1 continues the steady operation and the case where the delay cycle has lapsed after the fuel cut is started.

Specifically, at Step S13, the diagnosis module 111 sets the specific crank angle based on the close timing of the intake valve 21 and the ignition timing of the ignition plug 25. In this example, the diagnosis module 111 sets the specific crank angle so that the post-top timing becomes in the first half of the expansion stroke and the pre-top timing becomes before the ignition timing.

Then, at Step S14, the reading module 1113 of the diagnosis module 111 reads the detection signal of the in-cylinder pressure sensor SW6. In detail, the reading module 1113 sets the pre-top timing based on the specific crank angle set at Step S13 and reads the pre-top signal value corresponding to the setting.

Then, at Step S15, the estimating module 1114 of the diagnosis module 111 estimates the post-top signal value (post-top estimated value) which is expected to be realized if the in-cylinder pressure sensor SW6 has not failed, based on the pre-top signal value. Then, at Step S16 which continues from Step S15, the threshold setting module 1115 of the diagnosis module 111 sets the threshold corresponding to the post-top estimated value.

Then, at step S17, the reading module 1113 of the diagnosis module 111 again reads the detection signal of the in-cylinder pressure sensor SW6. In detail, the reading module 1113 sets the post-top timing based on the specific crank angle set at Step S13, and reads the post-top signal value corresponding to the setting.

Then, at step S18, the failure determining module 1112 of the diagnosis module 111 compares the post-top estimated value with the post-top signal value. In detail, the failure determining module 1112 compares the threshold set based on the post-top estimated value with the difference obtained by subtracting the post-top signal value from the pre-top signal value.

At Step S19, the failure determining module 1112 determines whether the difference between the pre-top signal value and the post-top signal value exceeds the threshold based on the post-top estimated value. Since it is considered that the in-cylinder pressure sensor SW6 has failed when the difference exceeds the threshold, the process shifts to Step S20 where the failure determining module 1112 increments a first failure determining counter by 1. Since it is considered that the in-cylinder pressure sensor SW6 does not fail when not exceeding the threshold, the process shifts to Step S21 where the failure determining module 1112 makes the failure determining counter 0.

Then, at Step S22, the failure determining module 1112 determines whether the first failure determining counter exceeds a given value. The given value may be about 3 to 5, for example. If the determination of Step S22 is NO, the process returns. If the determination of Step S22 is YES, the process shifts to Step S23. That is, if the failure determining module 1112 determines the failure of the in-cylinder pressure sensor SW6 continuously about several times, the failure determining module 1112 concludes at Step S23 that the in-cylinder pressure sensor SW6 has failed. A false diagnosis can be prevented by diagnosing the failure of the in-cylinder pressure sensor SW6 based on the plurality of determinations.

At the subsequent Step S24 after S23, the failure determining module 1112 informs of the failure through the informing device 57. Therefore, the user is informed of the failure of the in-cylinder pressure sensor SW6. As a result, the broken in-cylinder pressure sensor SW6 is replaced, for example.

(Time Chart)

Figure 15:
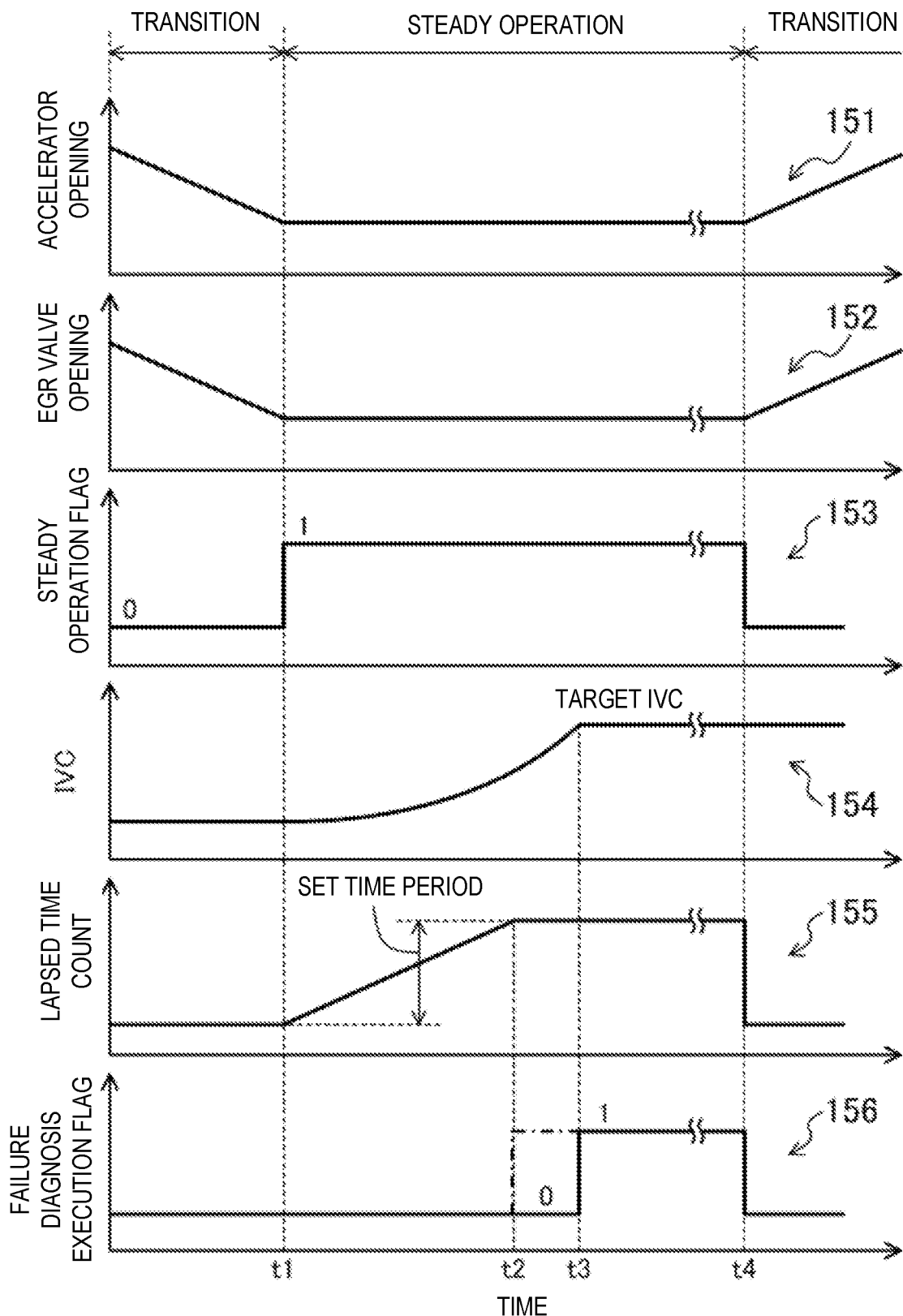
FIG. 15 is a time chart illustrating a change in each parameter related to the failure diagnosis of the in-cylinder pressure sensor.
Figure 16:
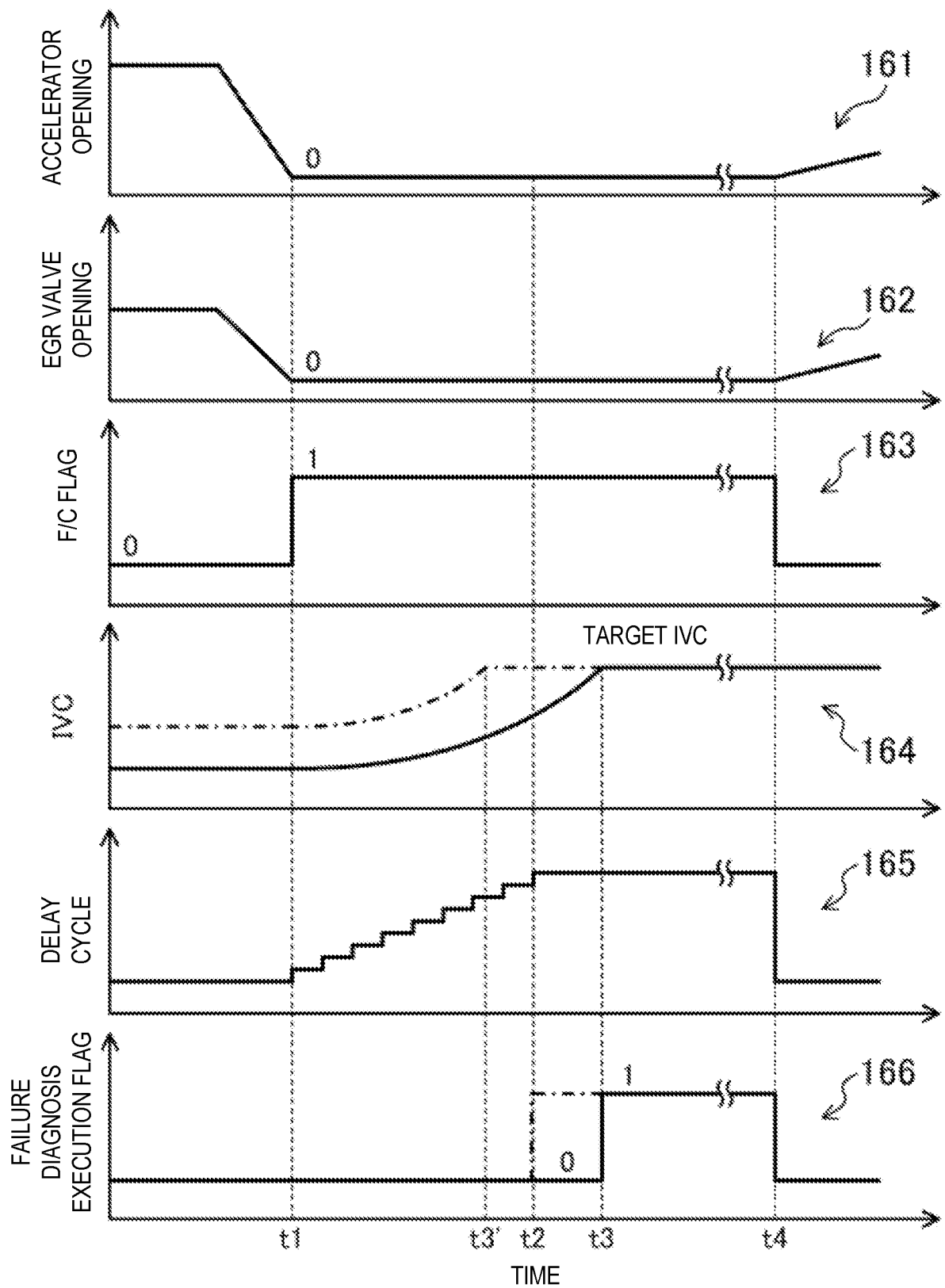
FIG. 16 is a time chart illustrating a change in each parameter during the failure diagnosis of the in-cylinder pressure sensor.

FIGS. 15 and 16 are time charts illustrating a change in each parameter when the failure diagnosis device 100 of the in-cylinder pressure sensor SW6 performs the failure diagnosis of the in-cylinder pressure sensor SW6 according to the flowchart of FIGS. 13A and 13B. In FIGS. 15 and 16, the horizontal axis indicates time.

FIG. 15 is a time chart when performing the failure diagnosis while the engine 1 continues the steady operation, and FIG. 16 is a time chart when performing the failure diagnosis upon the fuel cut operation.

—Failure Diagnosis while Continuing Steady Operation—

First, while the automobile travels, the operator releases the accelerator pedal which he/she has stepped on to return the accelerator opening, the accelerator opening becomes gradually smaller, and the accelerator opening then becomes substantially constant at a time t1 (refer to a waveform 151). Accordingly, the amount of fuel supplied to the combustion chamber 17 also becomes substantially constant. As a result, it is determined that the change in the amount of fuel becomes below a given amount.

Moreover, the valve opening of the EGR valve 54 becomes gradually smaller with the accelerator opening, and the valve opening of the EGR valve 54 becomes substantially constant at the time t1 (refer to a waveform 152). Accordingly, the amount of EGR gas contained in the mixture gas formed inside the combustion chamber 17 also becomes substantially constant. As a result, it is determined that the amount of change in the EGR gas becomes below a given value.

Note that although not illustrated in FIG. 15, in the time chart illustrated here, the amount of air filled up into the combustion chamber 17 also becomes substantially constant at the time t1. As a result, it is determined that the change in the amount of air filled up into the combustion chamber 17 becomes below a given value at the time t1.

In response to these determinations, the ECU 10 determines that the engine 1 carries out the steady operation. A steady operation flag indicating that the engine 1 carries out the steady operation becomes 1 from 0, as illustrated in a waveform 153, at the time t1. When the steady operation flag becomes 1, the operating state determining module 1111 counts a lapsed time after the steady operation flag becomes 1 from 0 (refer to a waveform 155). This count may be performed by directly measuring time, or indirectly measuring through the number of cycles.

At this time, the close timing of the intake valve 21 is changed to the target timing corresponding to the steady operation (refer to a waveform 154). According to the phase difference between the valve close timing before the change and the target timing, time required for the close timing of the intake valve 21 reaching the target timing varies.

As illustrated in a waveform 155, the operating state determining module 1111 determines that the engine 1 continues the steady operation for a given set period of time, at a time t2. Then, the operating state determining module 1111 determines that the valve timing of the intake valve 21 reaches the target timing, at a time t3. Thus, when the conditions of that the steady operation continues and the valve timing of the intake valve 21 becomes the target valve timing are both satisfied, the execution flag of the failure diagnosis becomes 1 from 0, as illustrated in a waveform 156, at the time t3.

When the execution flag of the failure diagnosis becomes 1, the failure determining module 1112 starts the failure determination of the in-cylinder pressure sensor SW6. Then, at a time t4, if the engine 1 shifts to the transitional operation from the steady operation when the operator steps on the accelerator pedal, the steady operation flag becomes 0 from 1. Simultaneously, the failure-diagnosis execution flag also becomes 0 from 1, in order to stop the failure diagnosis of the in-cylinder pressure sensor SW6. The count of the lapsed time is also reset.

—Failure Diagnosis while Carrying Out Fuel Cut Operation—

First, when the operator returns the accelerator pedal that was stepped on while the automobile travels, the accelerator opening becomes gradually smaller and, for example, the accelerator opening becomes zero at a time t1 (refer to a waveform 161). The opening of the EGR valve 54 becomes gradually smaller with the accelerator opening, and the opening of the EGR valve 54 also becomes zero at the time t1 (refer to a waveform 162). Note that although not illustrated in FIG. 16, the water temperature of the engine 1 exceeds the given value, and therefore, the slowdown fuel cut is possible. As illustrated by a waveform 163, an F/C flag becomes 1 from 0 at the time t1. When the F/C flag becomes 1, the engine control module 112 stops the supply of fuel. Therefore, the engine 1 carries out the fuel-cut operation after the time t1.

The close timing of the intake valve 21 is changed to the preset target timing.

According to a phase difference between the valve close timing before the change and the target timing, the time required for the close timing of the intake valve 21 reaching the target timing varies. If the phase difference is large, as illustrated by a solid line in a waveform 164, the time required for the close timing of the intake valve 21 reaching the target timing becomes longer. On the other hand, if the phase difference is small, as illustrated by a one-dot chain line in the waveform 164, the time required for the close timing of the intake valve 21 reaching the target timing becomes shorter.

As illustrated in a waveform 165, the delay determining module 1118 starts the count of cycle when the fuel cut begins. The delay cycle may be 7 to 9 cycles, for example. In the example of FIG. 16, the delay cycle has lapsed at a time t2.

Here, the delay cycle is set so as to be between the longest time (t3–t1) and the shortest time (t3'–t1), which are required for the close timing of the intake valve 21 reaching the target timing. The failure diagnosis of the in-cylinder pressure sensor SW6 is performed while the engine 1 carries out the fuel-cut operation. Once the engine 1 ends the fuel-cut operation, the failure diagnosis of the in-cylinder pressure sensor SW6 cannot be performed. If the failure diagnosis of the in-cylinder pressure sensor SW6 needs to be performed frequently, it is desirable to perform the failure diagnosis promptly after the fuel supply to the engine 1 is stopped. In order to raise the diagnostic frequency, it is more advantageous to lessen the delay cycle as much as possible. It becomes advantageous to raise the frequency of the failure diagnosis if the lapsed time of the delay cycle is shortened to be shorter than the longest change time required for the valve timing of the intake valve 21 becoming the target timing.

On the other hand, if the lapsed time of the delay cycle is made longer than the shortest change time required for the valve timing of the intake valve 21 becoming the target timing, it becomes advantageous to improve the accuracy of the failure diagnosis, because the state inside the combustion chamber 17 becomes stable. By adjusting the delay cycle (or the delay time), both the improvement of the accuracy of the failure diagnosis and the increase in the frequency of the failure diagnosis can be achieved.

In the example illustrated in FIG. 16, at a time t3, the conditions of that the delay cycle has lapsed and the valve timing of the intake valve 21 becomes the target valve timing are both satisfied. As illustrated in a waveform 166, at a time t3, an execution flag of the failure diagnosis becomes 1 from 0, and the failure determining module 1112 executes the failure determination of the in-cylinder pressure sensor SW6.

Note that in the example illustrated in FIG. 16, when the time point at which the valve timing of the intake valve 21 becomes the target timing is earlier (time t3'), the execution flag of the failure diagnosis become 1 from 0 at the time t2, as illustrated by an one-dot chain line in the waveform 166.

Then, at a time t4, when the operator steps on the accelerator pedal and the accelerator opening becomes larger than 0, the F/C flag becomes 0 for stopping the fuel cut. At the same time, since the failure diagnosis of the in-cylinder pressure sensor SW6 is also stopped, the failure diagnosis execution flag also becomes 0.

Other Embodiments

—Modification of Diagnostic Method—

In the above embodiment, the diagnosis module 111 is configured to determine the threshold based on the post-top estimated value, but it is not limited to this configuration. The threshold may directly be determined based on the pre-top signal value and the operating state of the engine 1, without the intervening post-top estimated value. In this case, the threshold indicates the same tendency as the pressure difference illustrated in FIGS. 10 to 12.

—Modification of Flowchart—

Figure 17:
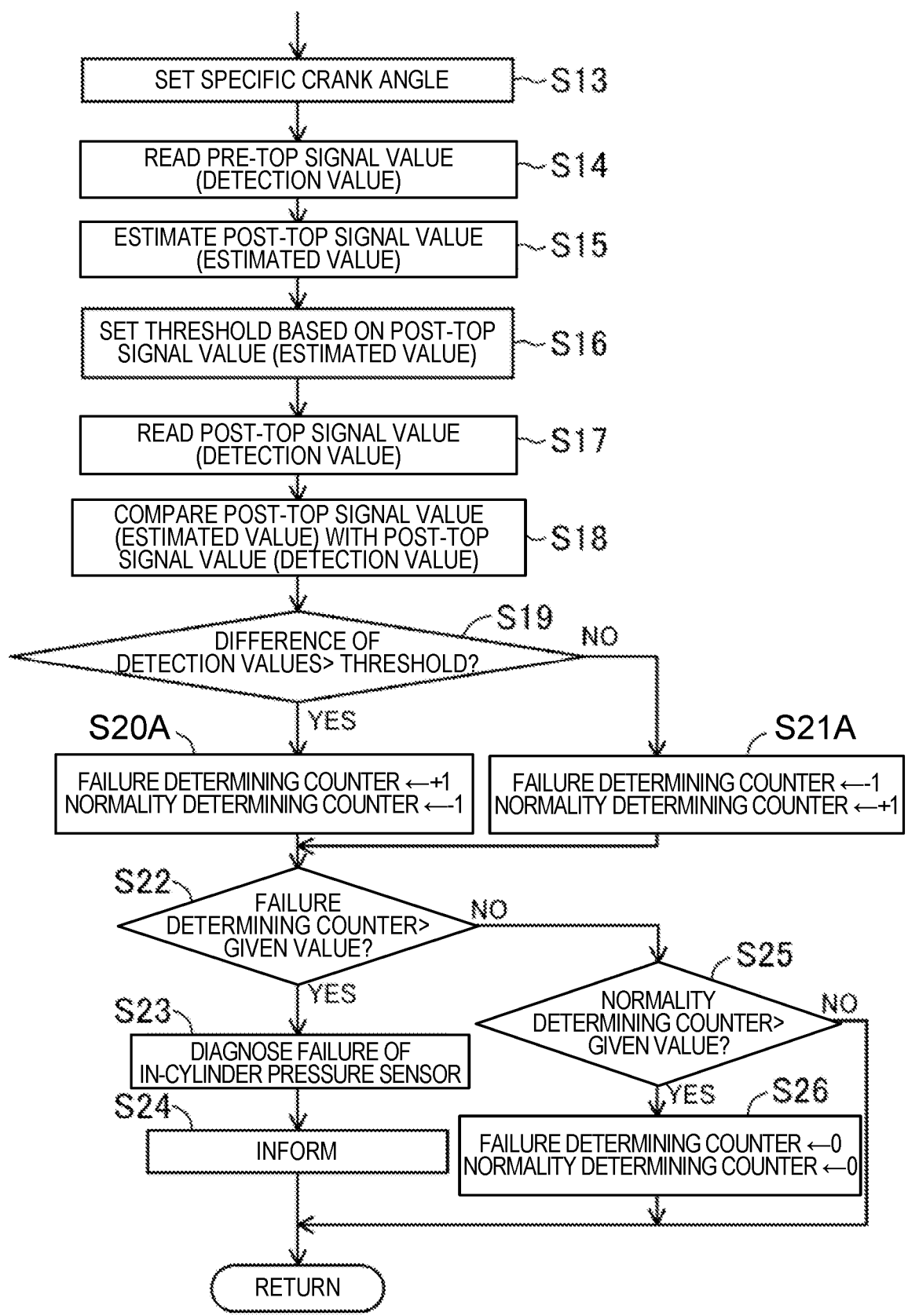
FIG. 17 is a flowchart illustrating a part of procedure of the failure diagnosis of the in-cylinder pressure sensor, which is different from FIG. 13B.

FIG. 17 illustrates a modification of the flowchart according to the failure diagnosis of the in-cylinder pressure sensor. Steps S20-S24 of FIG. 13B are replaced by Steps S20A-S26 of FIG. 17.

First, at Step S19, if the failure determining module 1112 determines that the difference between the pre-top signal value and the post-top signal value exceeds the threshold based on the post-top estimated value, the process shifts to Step S20A, and on the other hand, if the difference is determined to be below the threshold, the process shifts to Step S21A.

When the process shifts to Step S20A, since it is thought that the in-cylinder pressure sensor SW6 is failed, the failure determining module 1112 increments a failure determining counter by 1 and decrements a normality determining counter by 1. On the other hand, at Step S21A, since it is considered that the in-cylinder pressure sensor SW6 has not failed, the failure determining module 1112 decrements the failure determining counter by 1 and increments the normality determining counter by 1.

At the subsequent Step S22, the failure determining module 1112 determines whether the failure determining counter exceeds the given value. If the determination at Step S22 is YES, the process shifts to Step S23. That is, since the frequency of the determination as the in-cylinder pressure sensor SW6 being failure is higher than the frequency of the determination as the in-cylinder pressure sensor SW6 not being failed, the failure determining module 1112 concludes that the in-cylinder pressure sensor SW6 has failed, and at the subsequent Step S24, the failure determining module 1112 informs of the failure through the informing device 57.

On the other hand, if the determination at Step S22 is NO, the process shifts to Step S25. At Step S25, the failure determining module 1112 determines whether the normality determining counter exceeds the given value. If the determination at Step S25 is YES, the process shifts to Step S26. Since the frequency of the determination as the in-cylinder pressure sensor SW6 has not failed is higher than the frequency of the determination as the in-cylinder pressure sensor SW6 being failed, the failure determining module 1112 concludes that the in-cylinder pressure sensor SW6 does not fail, and makes the failure determining counter 0. Moreover, the failure determining module 1112 also makes the normality determining counter 0. On the other hand, if the determination at Step S25 is NO, the process returns.

Thus, the failure diagnosis device 100 can prevent the false diagnosis by diagnosing the failure of the in-cylinder pressure sensor SW6 using the two kinds of counters of the normal determining counter and the failure determining counter.

Instead of the configuration, the operating state determining module 1111 may determine an amount of change per unit time of each of the amount of air filled up in the combustion chamber 17, the amount of EGR gas contained in the mixture gas inside the combustion chamber 17, and the amount of fuel supplied to the combustion chamber 17. In this case, when all of these three amounts of change are determined to be below the respective given values, it can be determined that the engine 1 carries out the steady operation.

Note that the technology disclosed herein is not limited to be applied to the engine 1 of the above configuration. The engine 1 may adopt various configurations.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Engine
100 Failure Diagnosis Device
1111 Operating State Determining Module
1112 Failure Determining Module
1113 Reading Module
1114 Estimating Module
17 Combustion Chamber
25 Ignition Plug
71 Diaphragm
75 Piezo-electric Element
SW1 Airflow Sensor
SW2 First Intake Air Temperature Sensor
SW3 First Pressure Sensor
SW4 Second Intake Air Temperature Sensor
SW5 Intake Pressure Sensor
SW6 In-cylinder Pressure Sensor
SW7 Exhaust Temperature Sensor
SW8 Linear $O_2$ Sensor
SW9 Lambda $O_2$ Sensor
SW10 Water Temperature Sensor
SW11 Crank Angle Sensor
SW12 Accelerator Opening Sensor
SW13 Intake Cam Angle Sensor
SW14 Exhaust Cam Angle Sensor
SW15 EGR Differential Pressure Sensor
SW16 Fuel Pressure Sensor
SW17 Third Intake Air Temperature Sensor

What is claimed is:

1. A failure diagnosis device for an in-cylinder pressure sensor, comprising:
    an in-cylinder pressure sensor disposed so as to face to the inside of a combustion chamber of an engine mounted to an automobile, and configured to output a signal corresponding to a pressure inside the combustion chamber; and
    an engine controller comprised of circuitry configured to execute a diagnosis module into which the signal of the in-cylinder pressure sensor is inputted to diagnose a failure of the in-cylinder pressure sensor based on the signal of the in-cylinder pressure sensor,
    the diagnosis module including:
        a reading module configured to read the signal of the in-cylinder pressure sensor at a predefined first timing that is a timing retarded by a specific crank angle from a compression top dead center, and the signal of the in-cylinder pressure sensor at a predefined second timing that is a timing advanced by the specific crank angle from the compression top dead center; and
        a failure determining module configured to determine that the in-cylinder pressure sensor has failed when the failure determining module determines that a difference between a signal value of the in-cylinder pressure sensor at the first timing and a signal value of the in-cylinder pressure sensor at the second timing exceeds a predefined threshold.

2. The failure diagnosis device of claim 1, wherein the diagnosis module makes the threshold smaller as a speed of the engine increases.

3. The failure diagnosis device of claim 1, wherein the diagnosis module makes the threshold larger as an amount of air filled up in the combustion chamber increases.

4. The failure diagnosis device of claim 1,
    wherein the failure determining module repeatedly performs a comparison of the difference with the threshold, and
    wherein the failure determining module determines that the in-cylinder pressure sensor has failed when a determination that the difference exceeds the threshold is made continuously a plurality of times.

5. The failure diagnosis device of claim 4, further comprising an engine control module into which a signal of a one or more sensors at least including the in-cylinder pressure sensor is inputted and configured to operate the engine based on the signal of the one or more sensors,
    wherein the engine control module stops a supply of fuel to the engine when a fuel cut condition is satisfied while the automobile travels, and
    wherein the diagnosis module performs the failure diagnosis of the in-cylinder pressure sensor while the engine control module stops the supply of fuel to the engine.

6. The failure diagnosis device of claim 5, further comprising an ignition plug disposed so as to face to the inside of the combustion chamber and configured to ignite a mixture gas inside the combustion chamber in response to an ignition signal of the engine control module,
    wherein a portion of the mixture gas inside the combustion chamber starts combustion accompanied by flame propagation, by forcible ignition of the ignition plug, and remaining unburnt mixture gas then combusts by self-ignition,
    wherein the engine control module outputs the ignition signal to the ignition plug before a target timing so that the unburnt mixture gas self-ignites at the target timing, and
    wherein the engine control module estimates a timing at which the unburnt mixture gas self-ignites based on the signal of the in-cylinder pressure sensor.

7. The failure diagnosis device of claim 1, wherein the diagnosis module includes an informing device configured to inform of the failure when the failure determining module determines the failure of the in-cylinder pressure sensor.

8. The failure diagnosis device of claim 7, wherein the engine controller is connected to a warning lamp provided to the automobile, and causes the warning lamp to light up when the in-cylinder pressure sensor is determined to be failed.

9. The failure diagnosis device of claim 1, further comprising an engine control module into which a signal of one or more sensors at least including the in-cylinder pressure sensor is inputted and configured to operate the engine based on the signal of the one or more sensors,
    wherein the engine control module stops a supply of fuel to the engine when a fuel cut condition is satisfied while the automobile travels, and
    wherein the diagnosis module performs the failure diagnosis of the in-cylinder pressure sensor while the engine control module stops the supply of fuel to the engine.

10. The failure diagnosis device of claim 9, further comprising an ignition plug disposed so as to face to the inside of the combustion chamber and configured to ignite a mixture gas inside the combustion chamber in response to an ignition signal of the engine control module,
- wherein a portion of the mixture gas inside the combustion chamber starts combustion accompanied by flame propagation, by forcible ignition of the ignition plug, and remaining unburnt mixture gas then combusts by self-ignition,
- wherein the engine control module outputs the ignition signal to the ignition plug before a target timing so that the unburnt mixture gas self-ignites at the target timing, and
- wherein the engine control module estimates a timing at which the unburnt mixture gas self-ignites based on the signal of the in-cylinder pressure sensor.

* * * * *